(12) United States Patent
Stanwood et al.

(10) Patent No.: US 7,177,275 B2
(45) Date of Patent: Feb. 13, 2007

(54) SCHEDULING METHOD AND SYSTEM FOR COMMUNICATION SYSTEMS THAT OFFER MULTIPLE CLASSES OF SERVICE

(76) Inventors: Kenneth Stanwood, 935 Rosemary Ave., Carlsbad, CA (US) 92009; George Lin, 13756 Durango Dr., San Diego, CA (US) 92013; Yair Bourlas, 17876 Aguamiel Rd., San Diego, CA (US) 92127

( * ) Notice: Subject to any disclaimer, the term of this patent is extended or adjusted under 35 U.S.C. 154(b) by 613 days.

(21) Appl. No.: 10/207,648

(22) Filed: Jul. 26, 2002

(65) Prior Publication Data

US 2004/0017825 A1    Jan. 29, 2004

(51) Int. Cl.

| | |
|---|---|
| G08C 15/00 | (2006.01) |
| H04J 3/14 | (2006.01) |
| H04J 3/16 | (2006.01) |
| H04J 3/22 | (2006.01) |
| H04L 12/26 | (2006.01) |
| H04L 12/43 | (2006.01) |
| H04Q 7/00 | (2006.01) |

(52) U.S. Cl. ............... 370/230; 370/329; 370/458; 370/468

(58) Field of Classification Search ............... 370/328, 370/431, 442–444, 458–459, 229–230, 468
See application file for complete search history.

(56) References Cited

U.S. PATENT DOCUMENTS

| | | |
|---|---|---|
| 3,949,404 A | 4/1976 | Fletcher et al. |
| 4,495,619 A | 1/1985 | Acampora |
| 5,130,983 A | 7/1992 | Heffner, III |
| 5,297,144 A | 3/1994 | Gilbert et al. |
| 5,420,851 A | 5/1995 | Seshadri et al. |

(Continued)

FOREIGN PATENT DOCUMENTS

EP    0 353 759    2/1990

(Continued)

OTHER PUBLICATIONS

Lin., et al., "*Error Control Coding, Fundamentals and Applications*", Prentice-Hall Computer Applications in Electrical Engineering Series., 1993, pp. 315-349.

(Continued)

*Primary Examiner*—Kevin C. Harper
(74) *Attorney, Agent, or Firm*—Berkeley Law & Technology Group

(57) ABSTRACT

A method and system for prioritizing connection data that is associated with different classes of service for transmission in a frame based communication system. These classes of service can include CBR, nrt-VBR, MGR, and UPR traffic. One embodiment of the scheduling method and system uses hierarchical round-robin (HRR) with deficit round-robin (DRR). In this embodiment, the scheduling method and system guarantees minimum rates of nrt-VBR and MGR traffic to the connections. The excess bandwidth is then fairly allocated between the existing connections and their classes of service. For example, the excess is allocated for UBR traffic and for the excess demands of the nrt-VBR and MGR connections. In one embodiment, the scheduling method and system allocates the excess bandwidth in a frame to the existing connections using weighted round robin to differentiate between different classes of service. In one embodiment, excess allocation to nrt-VBR and MGR connections is rolled back into the deficit counters for the minimum guaranteed rates of nrt-VBR and MGR connections.

19 Claims, 7 Drawing Sheets

U.S. PATENT DOCUMENTS

| | | | |
|---|---|---|---|
| 5,444,696 A | 8/1995 | Petranovich | |
| 5,444,698 A | 8/1995 | Kito | |
| 5,479,447 A | 12/1995 | Chow et al. | |
| 5,511,082 A | 4/1996 | How et al. | |
| 5,517,503 A | 5/1996 | Hess | |
| 5,570,355 A | 10/1996 | Dail et al. | |
| 5,592,470 A | 1/1997 | Rudrapatna et al. | |
| 5,615,212 A | 3/1997 | Ruszczyk et al. | |
| 5,638,371 A | 6/1997 | Raychaudhuri et al. | |
| 5,638,374 A | 6/1997 | Heath | |
| 5,640,395 A | 6/1997 | Hamaleinen et al. | |
| 5,675,573 A | 10/1997 | Karol et al. | |
| 5,684,791 A * | 11/1997 | Raychaudhuri et al. | 370/310.2 |
| 5,710,762 A | 1/1998 | Petranovich | |
| 5,742,594 A * | 4/1998 | Natarajan | 370/336 |
| 5,742,610 A | 4/1998 | Natarajan | |
| 5,751,708 A | 5/1998 | Eng et al. | |
| 5,768,254 A | 6/1998 | Papadopoulos et al. | |
| 5,818,820 A | 10/1998 | Anderson et al. | |
| 5,818,828 A | 10/1998 | Packer et al. | |
| 5,828,695 A | 10/1998 | Webb | |
| 5,850,399 A | 12/1998 | Ganmukhi et al. | |
| 5,859,619 A | 1/1999 | Wu et al. | |
| 5,890,055 A | 3/1999 | Chu et al. | |
| 5,953,344 A | 9/1999 | Dail et al. | |
| 5,970,062 A * | 10/1999 | Bauchot | 370/310.2 |
| 5,978,374 A | 11/1999 | Ghaibeh et al. | |
| 5,978,375 A | 11/1999 | Petersen et al. | |
| 5,999,518 A | 12/1999 | Nattkemper et al. | |
| 6,006,069 A | 12/1999 | Langston | |
| 6,016,311 A | 1/2000 | Gilbert et al. | |
| 6,016,313 A | 1/2000 | Foster, Jr. et al. | |
| 6,031,827 A | 2/2000 | Rikkinen et al. | |
| 6,038,223 A | 3/2000 | Hansson et al. | |
| 6,038,455 A | 3/2000 | Gardner et al. | |
| 6,049,551 A | 4/2000 | Hinderks et al. | |
| 6,094,421 A | 7/2000 | Scott | |
| 6,097,733 A | 8/2000 | Basu et al. | |
| 6,108,346 A | 8/2000 | Doucette et al. | |
| 6,112,080 A | 8/2000 | Anderson et al. | |
| 6,137,787 A | 10/2000 | Chawla et al. | |
| 6,249,526 B1 | 6/2001 | Loukianov | |
| 6,570,883 B1 * | 5/2003 | Wong | 370/412 |
| 6,580,725 B1 * | 6/2003 | Phillips et al. | 370/461 |
| 6,819,658 B1 * | 11/2004 | Agarwal et al. | 370/316 |
| 2002/0118666 A1 * | 8/2002 | Stanwood et al. | 370/345 |
| 2002/0119783 A1 | 8/2002 | Bourlas et al. | |
| 2002/0122428 A1 | 9/2002 | Fan et al. | |
| 2003/0103497 A1 | 6/2003 | Speight | |

FOREIGN PATENT DOCUMENTS

| | | |
|---|---|---|
| EP | 0 507 384 A2 | 10/1992 |
| EP | 0 720 405 A2 | 7/1996 |
| EP | 0 891 060 A2 | 1/1998 |
| EP | 0 845 916 A2 | 6/1998 |
| WO | WO 92/22162 | 12/1992 |
| WO | WO 99/38343 | 7/1999 |
| WO | WO 99/39532 | 8/1999 |
| WO | WO 00/01188 | 1/2000 |
| WO | WO 00/72626 A1 | 11/2000 |

OTHER PUBLICATIONS

L.H. Charles Lee, "Convolutional Coding, Fundamentals and Applications", Artech House, Inc., 1997, p. 11-51.

Redl, et al., "An Introduction to GSM", Artech House, Inc., 1995; pp. 84, 85 and 95.

C.E. Shannon, "A Mathematical Theory of Communication", Bell System Technical Journal, pp. 379-423 (Part 1), 623-656 (Part II), Jul. 1948.

Ulm., et al., "Data-Over-Cable Interface Specifications, Radio Frequency Interface Specification", Hewlett Packard Interim Specification, Doc. Control No.: SP-RFII01-970321, published Mar. 21, 1997 by MCNS Holdings, L.P., Section 6, pp. 43-85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", 2nd Edition, Prentice Hall, Oct. 1995, Chapter 3, pp. 21-25.

Sampei, S. et al., Adaptive Modulation/TDMA Scheme for Personal Multi-Media Communication Systems, (Nov. 28, 1994) Telecommunications Conference (Globecom), IEEE, pp. 989-993.

Ue, Toyoki et al., Symbol Rate and Modulation Level Controlled Adaptive Modulation/TDMA/TDD for Personal Communication Systems, (Jul. 25, 1995) Proceedings of the Vehicular Technology Conference, IEEE, Vol Conf. 45 pp. 306-310.

H.C. Papadopoulos et al., Reduction of Mixed Co-channel Interference in Microcellular STDD Systems, Vehicular Technology Conference, 1995 IEEE 45th, vol. 2, pp. 759-763.

Sater G., Stanwood K., Media Access Control Layer Proposal for the 802.16.1 Air Interface Specification, IEEE 802.16 Broadband Wireless Access Working Group, 'Online! Jul. 7, 2000, XP002210334 Retrieved from the Internet: <URL: http://wirelessman.org/tgl/mac/contrib/802161mc-00_21rl.pdf> retrieved on Aug. 20, 2002, pp. 69-80.

PCT International Search Report for App. No. PCT/US03/22974, date of mailing Mar. 4, 2004.

* cited by examiner

SCHEDULING METHOD AND SYSTEM FOR COMMUNICATION SYSTEMS THAT OFFER MULTIPLE CLASSES OF SERVICE

BACKGROUND OF THE INVENTION

1. Field of the Invention

The present invention relates to communication systems and to a system and method for prioritizing transmission data from end users in such systems.

2. Description of the Related Art

A communication system facilitates two-way communication between a plurality of subscriber units (fixed and portable) and a fixed network infrastnicture. Exemplary communication systems include mobile cellular telephone systems, personal communication systems ("PCS"), cordless telephones, and wired systems. An objective of these communication systems is to provide communication channels on demand between the subscriber units and their respective base stations in order to connect a subscriber unit end user with the fixed network infrastructure. Some systems having multiple access schemes, a time "frame" is used as the basic information transmission unit. Each frame is sub-divided into a plurality of time slots. Subscriber units typically communicate with their respective base station using a "duplexing" scheme thus allowing for the exchange of information in both directions of the connection.

Transmissions from the base station to the subscriber units are commonly referred to as "downlink" transmissions. Transmissions from the subscriber units to the base station are commonly referred to as "uplink" transmissions. Depending upon the design criteria of a given system, wireless communication systems have typically used either time division duplexing ("TDD") or frequency division duplexing ("FDD") methods to facilitate the exchange of information between the base station and the subscriber units. However, such methods can also be used in wired systems.

These communication systems strive to maximize their utilization of their available bandwidth while also providing true bandwidth on demand to their users. However, when user bandwidth requests exceed the instantaneous available bandwidth, a selection process is utilized to determine which of the users will receive bandwidth at a given time. This section process can be based upon, for example, a first-come-first-serve basis where each user is treated similarly.

More recently, communications systems distinguish between different classes of service (CoS) or different quality of service (QoS) that are provided to the users. For example, some communication system that utilize Asynchronous Transfer Mode (ATM) systems offer CoS and/or QoS to their users. Other types of data traffic, for example, internet protocol (IP) can also be used in conjunction with CoS and/or QoS. For ease of explanation, the following description of various service categories uses terminology from an ATM based communication system. However, the systems and methods described below are not limited to an ATM based communication system. The typical classes of service are:

rt-CBR—Constant Bit Rate. This service provides users with a constant quantity of bandwidth whether they use it or not. An example is voice over T1 services.

rt-VBR—Real-time Variable Bit Rate. This service allocates data on a demand basis. The demand basis can include average rate and/or peak rate usage. This service is often delay and jitter intolerant. Examples are voice over AAL-2 or Voice over IP (VoIP).

nrt-VBR—Non-real-time Variable Bit Rate. This service allocates data on a demand basis. The demand basis can include average rate and/or peak rate usage. This service is more delay and jitter tolerant than the it-VBR service described above. VoIP and streaming video are sometimes implemented using this class of service.

MGR—Minimum Guaranteed Rate, sometime referred to as Guaranteed Frame Rate (GFR). This service is similar to the nrt-VBR service except that it includes a minimum committed rate. The minimum committed rate is guaranteed to be available when requested. MGR service further includes a peak rate. Demand greater than the committed rate but less than the peak rate is referred to as excess demand. Services such as streaming video are sometimes implemented using this class of service.

UBR—User Bit Rate, sometimes referred to as Available Bite Rate (ABR) or Best Effort. These services are very delay and jitter tolerant. An example is web surfing.

Communication systems that provide multiple classes of service to its end users are presented with having to prioritize transmission data while taking into account service characteristics for the classes of service.

SUMMARY OF THE INVENTION

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Preferred Embodiments" one will understand how the features of this invention provide several advantages over traditional scheduling methods and systems.

One aspect is a method of scheduling data from a plurality of connections for transmission in a frame based communication system and between a transmitting node and at least one receiving node, the plurality of connections being associated with multiple classes of service. The method comprises receiving a data from the plurality of connections at the transmitting node, selecting a first data group that is associated with a first class of service from the data, allocating bandwidth for the first group within a first frame, and determining whether additional bandwidth is available in the first frame. If bandwidth is available, then selecting a second data group that is associated with a second class of service from the data and allocating bandwidth for the second group within the first frame. If bandwidth is available in the frame after the second group is allocated, then grouping excess demand from the first and second classes of service, allocating bandwidth within the first frame for transmitting the excess demand, and transmitting the first data group, the second data group, and the excess demand to a first receiving node during the first frame.

Another aspect is a method of scheduling uplink transmission data from customer premise equipment (CPEs) by a base station using hierarchical round-robin scheduling. The method comprises receiving data from connections at the CPEs, the connections being associated with a plurality of classes, storing the data at each CPE, and transmitting a representation of the received data to the base station. The method further comprises determining a first uplink schedule at the base station for a first group of the connections up to each connection's committed rate using a first allocation scheme with a first priority applied between the plurality of classes, determining a second uplink schedule at the base station for a second group of the connections, which comprise one or more of the connections from the first group, which request additional allocation in excess of the committed rates that are within peak allowed rates using a second allocation scheme, wherein the plurality of classes have equal priority, and notifying the CPEs of the first and second uplink schedules.

Another aspect is a method for a base station to schedule uplink transmissions of data in a frame. The method comprises receiving a logical representation of each CPE's data queues, selecting data for the uplink transmission based on a quality of service (QoS) associated with each data queue for each CPE and based on each QoS having a first priority with respect to another QoS, selecting additional data for the uplink transmission based on the QoS associated with each data queue for each CPE and based on each QoS having a second priority different than the first priority with respect to another QoS, and allocating more or less of each uplink transmission frame for each data queue.

Still another aspect is a method of scheduling uplink transmission data from a customer premise equipment (CPE) to a base station using hierarchical round-robin scheduling. The method comprises receiving data from connections at a CPE, storing the data at the CPE, determining a first uplink schedule for a first group of the connections up to each connection's committed rate using a first allocation scheme with a first priority applied between a plurality of classes, determining a second uplink schedule for a second group of the connections, which comprise one or more of the connections from the first group, which request additional allocation in excess of the committed rates that are within peak allowed rates using a second allocation scheme, wherein the plurality of classes have equal priority, and transmitting the received data for the first and second groups to the base station.

A further aspect is a method of scheduling data for downlink transmission in a communication system which uses multiple modulations, wherein a base station transmits connection data that is associated with more than one modulation technique to more than one CPE. The method comprises receiving connection data at the base station, storing the connection data, selecting a first portion of the connection data that is associated with a first class of service using a first scheduling technique, and allocating bandwidth within a first frame for transmitting the first portion. If bandwidth is available in the frame after the first portion is allocated, then selecting a second portion of the connection data that is associated with a second class of service using a second scheduling technique and allocating bandwidth within the first frame for transmitting the second portion. If bandwidth is available in the frame after the second portion is allocated, then grouping an excess portion of the connection data, selecting a third portion of the excess portion using a first scheduling technique and allocating bandwidth within the first frame for transmitting the third portion. The method further comprises transmitting the first, second, and third portions during the first frame to the CPEs.

Still another aspect is a method of scheduling transmission data for an existing group of connections using hierarchical round-robin scheduling, the method comprising scheduling bandwidth for a first group of the existing connections divided up into a plurality of classes using a first allocation scheme with a first priority applied between the plurality of classes, wherein each connection has a committed rate and scheduling bandwidth for a second group of the existing connections, comprising one or more of the connections in the first group, in excess of the committed rate for each connection that are within peak allowed rates using a second allocation scheme, wherein the plurality of classes have equal priority.

Another aspect is a system for allocating communication bandwidth in a frame each connection being associated with a class of service and a committed rate, each class of service having a different first priority than another class of service for committed rates, and each class of service having a different second priority than another class of service above the committed rates. The system comprising connection data transmitted by the connections which exceeds the communication bandwidth in the frame and a receiving node configured to utilize a plurality of allocation schemes to order the connection data for each class of service, wherein the connection data from each connection that is associated with the same class of service is scheduled using the first priority for connection data up to committed rates, and wherein the connection data from each connection that is associated with the same class of service is scheduled using the second priority for connection data above the committed rates.

Still another aspect is a system for scheduling connections using hierarchical round-robin scheduling. The system comprising a first node configured to receive transmission data from a plurality of connections and allocate portions of a first transmission frame to the transmission data, the plurality of connections being assigned to a plurality of classes of service, committed rates of the plurality of connections are scheduled using deficit round robin with strict priority between the plurality of classes of service, and transmission data in excess of the committed rates, yet within peak allowed rates is scheduled using deficit round robin with all of the plurality of classes of service having equal priority and a second node configured to receive the first transmission frame.

Another aspect is a method of scheduling data for uplink transmission by a CPE where the CPE transmits connection data that is associated with more than one class of service. The method comprises receiving connection data at a CPE, storing the connection data in queues, selecting a first portion of the connection data that is associated with a first class of service using a first scheduling technique, and allocating bandwidth within a first frame for transmitting the first portion. If bandwidth is available in the frame after the first portion is allocated, then selecting a second portion of the connection data that is associated with a second class of service using a second scheduling technique, and allocating bandwidth within the first frame for transmitting the second portion. If bandwidth is available in the frame after the second portion is allocated, then grouping an excess portion of the connection data that is associated with the first class of service and the second class of service, selecting a third portion of the excess portion using a first scheduling technique, and allocating bandwidth within the first frame for transmitting the third portion. The method further comprises transmitting the first, second, and third portions during the first frame to the base station.

A further aspect is a system for scheduling connections between a base station and a customer premise equipment in a transmission frame. The system comprises a first node configured to receive transmission data from a plurality of connections and allocate portions of a first transmission frame to the transmission data, the plurality of connections being assigned to a plurality of classes of service, committed rates for a first portion of the plurality of connections is scheduled using weighted round robin, committed rates for a second portion of the plurality of connections is scheduled using deficit round robin, with strict priority between the first and the second portions, and transmission data from the first and the second portions that is in excess of the committed rates, yet within peak allowed rates is scheduled using deficit round robin with same priority between the first and the second portions and a second node configured to receive the first transmission frame.

Still another aspect is a method of scheduling data for uplink transmission by a CPE where the CPE transmits connection data that is associated with more than one class of service. The method comprises receiving connection data from a plurality of connections assigned to a plurality of classes of service, storing the connection data in queues at the CPE, grouping the connection data based on each connection data's class of service, selecting the connection data that is associated with a first class of service, and assigning the selected connection data to a frame using a scheduling technique that prioritizes the connections within the first class of service. If the frame is full, then incrementing the frame count by one, and selecting additional connection data from the queue that is associated with the first class of service. If the frame is not full, then selecting connection data that is associated with a second class of service that has a lower priority than the first class of service, and assigning the selected connection data to the frame using a scheduling technique that prioritizes the connections within the second class of service. If the frame is full, then incrementing the frame count by one, and selecting additional connection data from the queue that is associated with the first class of service. If the frame is not full, then selecting connection data that is associated with a third class of service that has a lower priority than the second class of service, and assigning the selected connection data to the frame using a scheduling technique that prioritizes the connections within the third class of service. If the frame is full, then incrementing the frame count by one and selecting additional connection data from the queue that is associated with the first class of service. If the frame is not fill, then linking excess demand of the second and the third classes of service together, selecting connection data that is associated with the linked excess demand, assigning the selected connection data to the frame using a scheduling technique that prioritizes the linked excess demand, and transmitting the frame to the base station.

A further aspect is a method of scheduling data for downlink transmission by a base station where the base station transmits connection data that is associated with more than one class of service using a plurality of modulation techniques. The method comprises receiving connection data from a plurality of connections for transmission to a plurality of CPEs, the plurality of connections being assigned to a plurality of classes of service, storing the connection data in queues at the base station, grouping the connection data based on each connection data's class of service, normalizing the connection data to a common modulation, selecting the connection data that is associated with a first class of service, and assigning the selected connection data to a frame using a scheduling technique that prioritizes the connections within the first class of service. If the frame is full, then incrementing the frame count by one, and selecting additional connection data from the queue that is associated with the first class of service. If the frame is not full, then selecting connection data that is associated with a second class of service that has a lower priority than the first class of service, and assigning the selected connection data to the frame using a scheduling technique that prioritizes the connections within the second class of service. If the frame is full, then incrementing the frame count by one and selecting additional connection data from the queue that is associated with the first class of service. If the frame is not full, then selecting connection data that is associated with a third class of service that has a lower priority than the second class of service and assigning the selected connection data to the frame using a scheduling technique that prioritizes the connections within the third class of service. If the frame is full, then incrementing the frame count by one and selecting additional connection data from the queue that is associated with the first class of service. If the frame is not full, then linking excess demand of the second and the third classes of service together, selecting connection data that is associated with the linked excess demand, assigning the selected connection data to the frame using a scheduling technique that prioritizes the linked excess demand, and transmitting the frame to the plurality of CPEs using a plurality of modulation techniques.

DETAILED DESCRIPTION OF THE PREFERRED EMBODIMENT

Preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjuction with a detailed description of certain specific preferred embodiments of the present invention.

Figure 1:
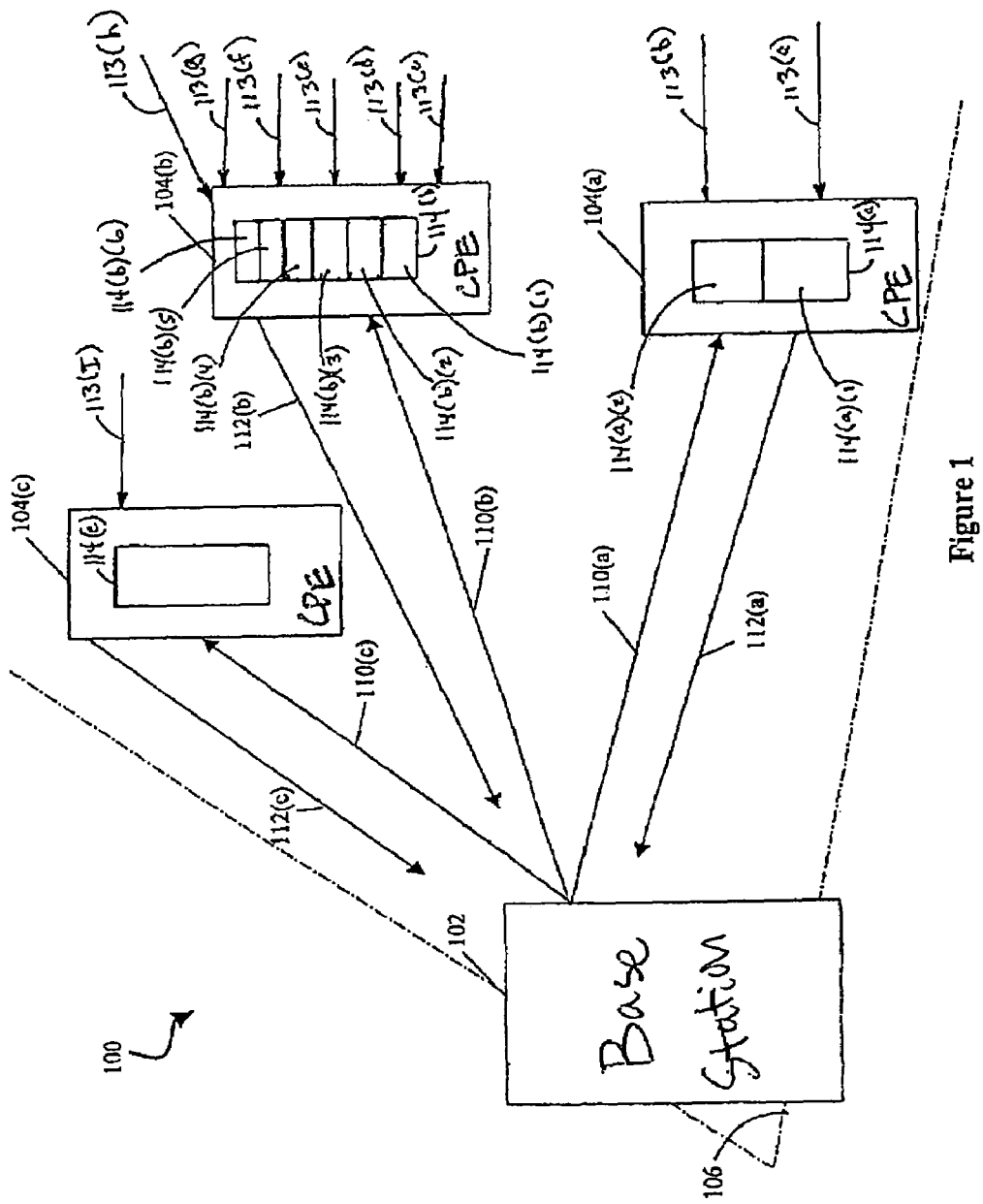
FIG. 1 is a block diagram of an exemplary wireless communication system.

FIG. 1 is a block diagram of an exemplary wireless communication system 100. One exemplary broadband wireless communication system is described in U.S. Pat. No. 6,016,311, by Gilbert et al., issued Jan. 18, 2000, entitled "ADAPTIVE TIME DIVISION DUPLEXING METHOD AND APPARATUS FOR DYNAMIC BANDWIDTH ALLOCATION WITHIN A WIRELESS COMMUNICATION SYSTEM," hereby incorporated by reference. Another exemplary broadband wireless communication system is described in U.S. patent application Ser. No. 10/032,044, filed on Dec. 21, 2001, entitled "ADAPTIVE CALL ADMISSION CONTROL FOR USE IN A WIRELESS COMMUNICATION SYSTEM," which is hereby incorporated by reference. Still another exemplary broadband wireless communication system is described in U.S. patent application Ser. No. 09/991,532, filed on Nov. 15, 2001, entitled "IMPROVED FRAMING FOR AN ADAPTIVE MODULATION COMMUNICATION SYSTEM," which is hereby incorporated by reference.

The above listed communication systems are only examples of communication systems that can incorporate the scheduling methods and systems herein disclosed. The above-cited references are wireless communication systems, however, the scheduling method and system is not limited to use with wireless communication systems. For example, the scheduling method and system can be used with wired communication systems and communication systems which include a combination of wired and wireless technology. Additionally, the scheduling methods and systems can be used for uplink communication as well as downlink communication. Moreover, the scheduling methods and systems can be used in communication systems where requests for bandwidth exceed the available bandwidth in any given period of time. In such systems, the scheduling method and system provide for allocating portions of the available bandwidth among different classes of service (CoS) or qualities of service (QoS) in the given period of time.

Still referring to FIG. 1, the system 100 can include a base station 102 and at least one customer premise equipment (CPE). The base station can be any communication device that is configured to transmit in a point to multi-point topology. The CPE can be any communication device that is configured to receive the transmissions from the base station. The system depicted in FIG. 1 shows three CPEs 104(a)–(c). More or fewer CPEs can be used. The CPEs and the base station receive and transmit data along wireless communication links 110(a)–(c), 112(a)–(c).

FIG. 1 does not show buildings or other physical obstructions (such as trees or hills, for example), that may cause channel interference between data from communication links 110, 112. The CPEs 104 and the base station 102 communicate by transmitting their data as radio frequency signals. The term channel refers to a band or range of radio frequencies of sufficient width for communication. For example, the range of frequencies from 26.500 GHz to 26.525 GHz would provide a 25 MHz wide channel. Although the following discussion uses the example of a system that transmits information within the Local Multi-Point Distribution Services (LMDS) band at frequencies of approximately 28 GHz, the invention is not so limited. Information can be transmitted at various frequencies and ranges including, for example, 10 GHz to 66 GHz using Quadrature Amplitude Modulation (QAM) symbols. The systems and methods described herein can also be used in a Multichannel Multi-point Distribution Service (MMDS) which operates below 11 GHz. In the MMDS, Orthogonal Frequency Division Multiplexing (OFDM) symbols may be transmitted between the base station and CPEs as an alternative to single carrier QAM modulation. In such a system, the methods and systems are applied to one or more of the OFDM subchannels.

Referring again to FIG. 1, the communication links 110(a), 110(b), 110(c) are referred to as downlinks (i.e., from the base station 102 to the CPE's 104) and can operate on a point (base station)-to-multi-point (CPE's) basis. Transmissions to and from the base station 102 can be directional in nature, and thus limited to a particular transmission sector 106 of the base station 102. Within a given sector 106, CPEs 104(a), 104(b), 104(c) receive the same transmission along their respective downlinks 110(a), 110(b), 110(c). To distinguish between data intended for a specific CPE, the CPEs can monitor control information in their respective downlink 110(a), 110(b), 110(c) and typically retain only the data intended for them. In communication systems that have multiple sectors, the base station 102 can include a sectored active antenna array (not shown) which is capable of simultaneously transmitting to multiple sectors. In one embodiment of the system 100, the active antenna array transmits to four independent sectors.

The communication links 112(a), 112(b), 112(c) are referred to as an uplink (i.e., from the CPEs 104 to the base station 102) and can operate on a point-to-point basis. Thus, in FIG. 1, each CPE 104(a), 104(b), 104(c) originates its own uplink 112(a), 112(b), 112(c). Communication with the base station 102 is bi-directional and can be multiplexed on the basis of Time Division Duplexing (TDD). For a TDD transmission from, for example, CPE 104(a), CPE 104(a) would send its data along communication link 112(a) to the base station 102 during a previously allocated time slot in a transmission frame. The specific frame structures of the uplink and downlink will be discussed further below.

Alternatively, the system can employ Frequency Division Duplexing (FDD). In such an FDD system, duplexing of transmissions between the base station and the CPEs is performed in the frequency domain. Different sets of frequencies are allocated for uplink and downlink transmissions. The systems and methods described herein can be used in such an FDD system.

Each CPE 104 is further coupled to one or more end users that may include both residential and business customers. Each customer can have one or more connections 113 or connection paths between the CPE and the base station. The simplified example system depicted in FIG. 1 shows nine total connections 113(a)–(i). Of these nine connections, FIG. 1 shows CPE 104(b) having six connections 113(c)–113(h). In one embodiment, six end users each have one of the six connections to CPE 104(b). Alternatively, one or more of the end users can have two or more of the six connections to CPE 104(b). Each connection 113 can have different and varying usage, quality of service (QoS), and bandwidth requirements. Each CPE 104(a)–(c) may service several hundred or more end users, typically at least one end user will be assigned to transmit and receive data via at least one connection through each CPE 104.

The wireless communication system 100 can provide "bandwidth-on-demand" to the CPEs. Bandwidth that is allocated to a CPE, the location of the bandwidth allocation within the transmission frame, and the duration of the allocation can be dynamic on a transmission frame by transmission frame basis. Thus, the uplink can include bandwidth requests for new and existing connections. The CPEs request bandwidth allocations from their respective base station 102 based upon the quality of service (QoS) and the class of service (CoS) requested by the end users served by the CPE. Thus, each connection potentially uses a different broadband service having different bandwidth and latency requirements.

To this end, the type and quality of service available to the connections are variable and selectable. The amount of bandwidth dedicated to a given connection can be determined by the information rate and the quality of service (QoS) required by that connection. For example, T1-type continuous data connection typically requires a great deal of bandwidth having well controlled delivery latency. Until terminated, this connection requires constant bandwidth allocation for its connection data in each downlink and uplink. In contrast, certain types of connections such as Internet Protocol connections ("TCP/IP") are bursty, often idle (which at any one instant may require zero bandwidth), and are relatively insensitive to delay variations when active.

The connection data is buffered into a buffer 114(a)–(c) by the receiving CPE. For example, CPE 104(b) buffers data from its six connections into the buffer 114(b). The CPEs 104(a)–(c) maintain queues 114(a)(1)–(a)(2), 114(b)(1)–(b)(6), 114(c) within each buffer 114(a)–(c) for the data from each of their connections. In this way, each CPE tracks how much data each connection has in their respective queues. Each CPE can further track how much data it transmits from each queue. For example, CPE 104(b) maintains six queues 114(b)(1)–(b)(6), one for each of its six connections 113(c)–113(h).

The CPEs select connection data for transmission from the buffers 114(a)–(c). Within each buffer the CPE selects connection data from the queues based on the methods and systems disclosed herein. Once selected, the data is assigned for transmission to the base station 102 during a first transmission frame. The CPEs select additional connection data from the queues for transmission during a subsequent frame according to the methods and systems disclosed herein.

Figure 2:
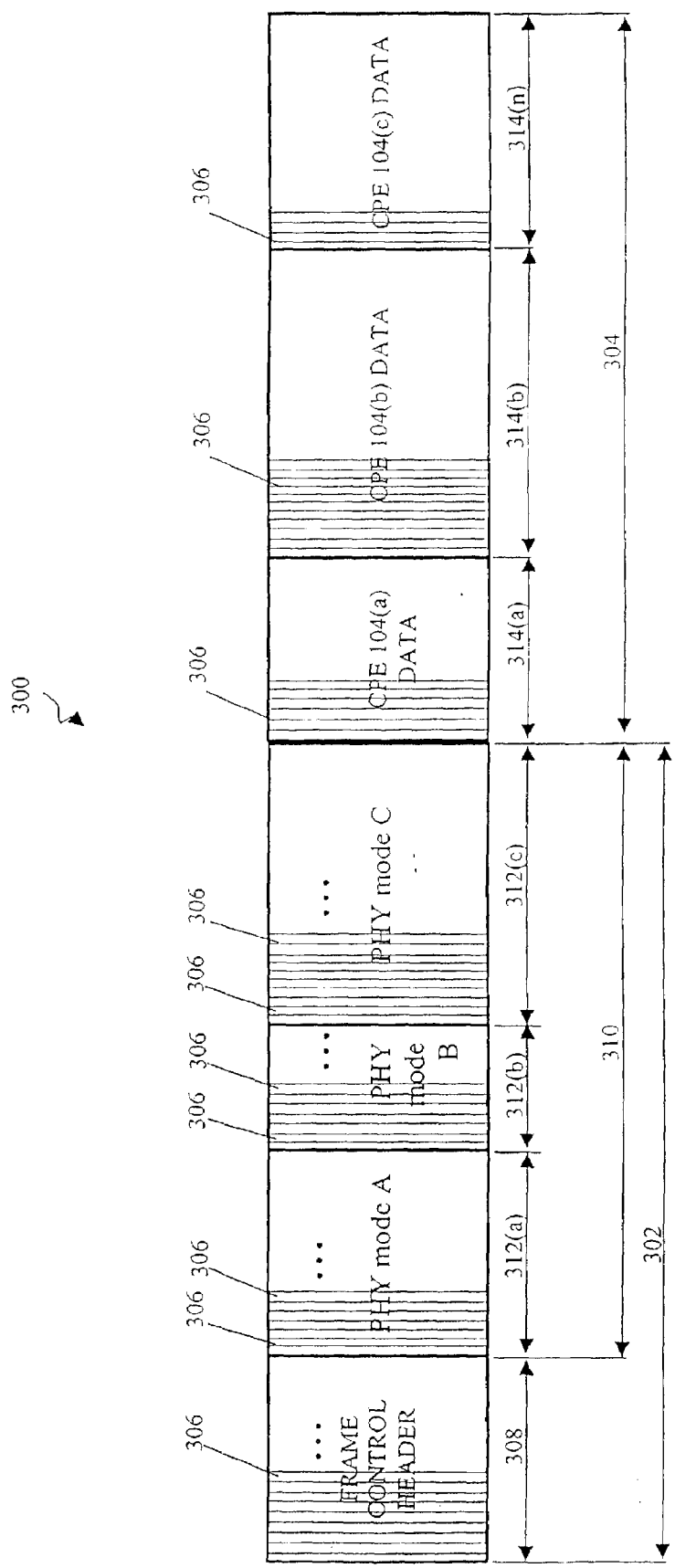
FIG. 2 is an illustration of the structure of a Time Division Duplex ("TDD")

FIG. 2 represents one embodiment of a frame structure for use with the communication system of FIG. 1. This embodiment is a time division duplexing ("TDD") frame and multi-frame structure for use in communication system 100. Transmission frame 300 includes a downlink subframe 302 and an uplink subframe 304. The downlink subframe 302 is used by the base station 102 to transmit information to the CPEs 104(a)–(c). In any given downlink subframe 302, all, some, or none of the transmitted information is intended for a specific CPE 104. The base station 102 may transmit the downlink subframe 302 prior to receiving the uplink subframe 304. The uplink subframe 304 is used by the CPEs 104(a)–(c) to transmit information to the base station 102.

Subframes 302, 304 are subdivided into a plurality of physical layer slots (PS) 306. Each PS 306 correlates to a duration of time. For example, in FIG. 2, each subframe 302, 304 can be one-half millisecond in duration and include 400 PS for a total of 800 PS per transmission frame 300. Alternatively, subframes having longer or shorter durations and with more or fewer PSs can be used. Additionally, the size of the subframes can be asymmetrical and can vary frame to frame.

Each downlink subframe 302 can include a frame control header 308 and downlink data 310. The frame control header 308 includes information for the CPEs to synchronize with the base station 102. The frame control header 308 can include control information relevant to the downlink. The frame control header 308 can also include a map of a subsequent uplink subframe 304. This map allocates the PSs 306 in the uplink subframe 304 between the different CPEs. The frame control header 308 can further include a map of attributes of the downlink data 310. For example, attributes may include, but are not limited to, the locations of the PSs 306 in the subframe 302 that are intended for each individual CPE.

The downlink data 310 is transmitted using a pre-defined PHY mode or a sequence of PHY modes with three exemplary PHY modes A, B, and C depicted in FIG. 2. Individual or groups of PSs 306 in the downlink subframe 302 are assigned to data intended for specific CPEs 104. For example, the base station 102 could assign PSs in one, some, or all of the PHY modes A, B, and C for transmitting data to CPE 104(a). In FIG. 2, the data is divided into three PHY modes, where PHY mode A (312(a)) is the most robust modulation (i.e. least prone to transmission errors caused by signal interference) and while PHY mode C (312(c)) is the least robust (i.e. most prone to transmission errors caused by signal interference). In between these PHY modes is PHY mode B (312(b)). Additional PHY modes can also be used.

Still referring to FIG. 2, the uplink subframe 304 comprises uplink data blocks 314(a)–(n). The uplink subframe 304 is used by the CPEs 104(a)–(c) to transmit information to the base station 102. The subframe 304 is subdivided into a plurality of PSs 306. Each CPE 104(a)–(c) transmits its information during its allocated PS 306 or range of PSs 306. The PSs 306 allocated for each CPE can be grouped into a contiguous block of a plurality of data blocks 314(a)–(n). The CPEs use data blocks 314(a)–(n) to transmit the uplink subframe 304. The range of PSs 306 allocated to each block in the plurality of data blocks 314(a)–(n) can be selected by the base station 102.

As explained above, one method of accommodating the connections of CPE 104(b) is to transmit some of the connections' data during a frame that is subsequent to frame 300. However, if a connection requires a constant bit rate connection between the CPE 104(b) and the base station 102 and the CPE 104(b) allocates that connection's data in a way that the required constant bit rate is not maintained, the connection could be dropped. The methods and systems described herein determine which connection data received by CPE 104(b) from the connections 113(a)–(h) is allocated to frame 300 and to one or more subsequent frames. The methods and systems take into account, for example, each connection's class of service (CoS) or quality of service (QoS).

The methods and system disclosed herein can further be implement by the base station 102 to transmit data to the CPEs 104(a)–(c) in the downlink transmission frame. For example, in communication systems that use adaptive modulation, the base station 102 can utilize a plurality of modulation techniques in its downlink transmission frame when transmitting to the CPEs 104(a)–(c). In this embodiment, the base station 102 individually buffers data intended for each CPE in queues. Within the buffered data for each CPE, the base station 102 stores the connection data for each connection in individual queues. The base station selects data for the downlink transmission frame and for one or more subsequent frames from each individual queue depending on the modulation technique for each CPE and a class of service (CoS) or quality of service (QoS) associated with each connection. Depending on the queues, the base station can allocate more or less of each downlink transmission frame for each modulation technique. The allocation between CPEs in the downlink transmission frame can further vary frame-by-frame.

The methods and system disclosed herein can further be implement by the base station 102 to allocate data transmitted by the CPEs 104(a)–(c) to the base station 102 in the uplink transmission frame. In this embodiment, the base station 102 receives a logical representation of each CPE's data queues 114(a)(1)–(a)(2), 114(b)(1)–(b)(6), 114(c) within each buffer 114(a)–(c) from the CPEs. The CPEs can transmit the logical representation in a prior uplink transmission frame. The logical representations may take the form of bandwidth requests. Using these logical representations, the base station 102 allocates bandwidth for the connection data for each CPE to uplink to the base station 102. Since the base station 102 has a logical representation of the queues, the base station can perform the same allocation process that is described above as being employed by each CPE. Moreover, since the base station 102 can compare data queues from the CPEs that it services, the base station can increase or decrease the portions of the uplink transmission frame that are allocated for each CPE. Thus, depending on the queues 114(*a*)(1)–(*a*)(2), 114(*b*)(1)–(*b*)(6), 114(*c*), the base station can allocate more or less of each uplink transmission frame for each CPE. The allocation by the base station is transmitted to the CPEs during a downlink transmission frame. In one embodiment, each CPE subsequently updates it allocation received from the base station 102 based on changes in its data queues 114(*a*)(1)–(*a*)(2), 114(*b*)(1)–(*b*)(6), 114(*c*) since the logical representation was transmitted to the base station 102.

The implementation of the CPE selecting data for transmission on the uplink will be used as an example to explain the invention. The example will point out where the other implementations may differ in details. Still referring to FIG. 2, the data transmitted in each data block 314(*a*)–(*n*) is modulated by the transmitting CPE. For example, CPE 104(*a*) modulates and transmits uplink data block 314(*a*). The same or different PHY modes can be used for each data block 314(*a*)–(*n*). The data blocks 314(*a*)–(*n*) can also be grouped by PHY mode. The choice of PHY mode is typically instructed by the base station. Following the example above, CPE 104(*b*) could select a less robust modulation technique for data block 314(*b*). The less robust modulation technique allows CPE 104(*b*) to transmit additional data during a frame to the base station 102. However, depending on the service needs of its connections as well as the desired transmission quality, CPE 104(*b*) may still be unable to transmit all of the data from its connections during the frame 300.

Typically, during the data blocks, each CPE transmits with a PHY mode that is selected based on measured channel parameters from its prior transmission(s). Similarly, the base station 102 can select a downlink PHY mode for a communication link based on measured channel parameters from its prior transmission(s). The measured channel parameters can be included in the uplink subframe 304 for transmission by the CPEs to the base station or can be included in the downlink subframe 302 for transmission by the base station to the CPE. Once received, the base station or CPE can utilize the channel parameters to determine if the PHY mode of the downlink subframe 302 or the uplink subframe 304 should be changed. The change in PHY mode affects the physical bandwidth required to send the same rate of application data, affecting the available data rate which is used by the invention.

Each CPE 104 can receive all downlink transmissions that are modulated using its current PHY mode or are modulated using a more robust PHY mode than its current PHY mode. The frame control header 308 is typically modulated using the most robust PHY mode to ensure that all CPEs 104(*a*)–(*c*) may receive it. Because each CPE receives the frame control header, each CPE 104 is initially synchronized with the downlink subframe 302 at the beginning of the frame 300. The downlink subframe can be sorted by robustness, which allows each CPE to maintain synchronization during the subsequent portion of the downlink that could include data for that CPE.

The methods and systems disclosed herein determine what connection data from the connections 113 of each CPE 104 will be transmitted during the frame 300 and subsequent frames. The methods and systems prioritize the connection data that is buffered in each CPE's queues or alternatively downlink queues in the base station or logical representations of CPEs' queues in the base station The CPE can select the connection data from the queues based on the class of service associated with the connections from where the connection data was received. For example, connections with hard bandwidth commitments are prioritized above soft bandwidth commitments. Soft bandwidth commitments are less sensitive to delays in transmission. The CPE can determine whether there will be enough physical slots 306 in frame 300 for its transmission of connection data that requires hard bandwidth commitments between the base station and CPE. For example, if enough physical slots 306 are available, the CPE transmits the connection data that requires hard bandwidth commitments. If additional physical slots 306 are available, the CPE can select connection data from its queues that requires soft bandwidth commitments for transmission during frame 300. These hard bandwidth commitments can include, for example, constant bit rate (CBR) connections, the minimum cell rate (MCR) portion of guaranteed frame rate (GFR) connections, and some function of sustainable cell rate (SCR) for variable bit rate (VBR) and variable bit rate real-time (VBR-rt) connections. Soft bandwidth commitments can include for example, user bit rate connections, the difference between the hard bandwidth commitments and the Peak Cell Rate (PCR) of GFR and VBR connections, and Best Effort connections, The hard and soft bandwidth commitment types will be further described below Further, the systems and methods described are applied to one or more classes of service (CoS) or quality of service (QoS).

The scheduling method and system is used to determine which connections receive physical slots 306 from its CPE during a period or duration of time. Examples of periods of time include a frame in a system with a frames Physical layer or a scheduling interval in a system with an unframed Physical layer. The data rate multiplied by the duration gives the amount of bandwidth required. Examples of data rates include bytes per second, ATM cells per second, physical slots 306 per second, or frames. The connection data through a given CPE is buffered in the queues. The connection data is linked by one or more classes of service (CoS). Once a CPE's connections are linked, that CPE applies the methods and systems disclosed herein to prioritize each linked group of connections. For example, the connection data could be linked by two CoS. In this example, the CPE is configured to traverse the list of connection data via both classes of service to prioritize the connection data. In this way, the CPE can make a first pass through the connection data based on a first CoS and then make a second pass through the remaining connection data based on the second CoS.

The order of determination of bandwidth allocation for data from the CPE to the base station is based on the priority assigned to the connections. For example, a CPE can receive data that is associated with hard and soft bandwidth commitment types, or classes of service, as described above. The CPE then links the connections based on each connection's class of service. As introduced above, these classes of service can include, CBR—Constant Bit Rate, rt-VBR—Real-time Variable Bit Rate, nrt-VBR—Non-real-time Variable Bit Rate, MGR—Minimum Guaranteed Rate and UBR—User Bit Rate. This list is not intended to be an exhaustive list of all possible classes of service known nor is it intended to limit the classes of service that can be prioritized by the methods and systems disclosed herein.

Continuing with this example, once the connections are linked by class of service, the CPE 104 can employ the methods and systems disclosed herein to prioritize each linked group of connections as well as the data in the queues for each connection. Each CPE can then compare the highest priority connection data to the number of physical slots 306 that are allocated for its transmission to the base station during the current frame. The highest priority connection data can include homogeneous or heterogeneous classes of service. For example, the highest priority connection data can include data only from CBR connections. Alternatively, the highest priority connection data can include CBR and rt-VBR connections.

If the number of physical slots 306 allocated between the CPE and the base station during transmission frame 300 exceeds bandwidth needed for the highest priority connection data, the scheduling method and system can transmit all of the highest priority connection data during the frame 300. Alternatively, the scheduling method and system can select less than all of the highest priority connection data for transmission during the frame 300 even though additional physical slots 306 are available. The CPE can select some of the highest priority connection data based on a predetermined priority within the same class of service. In this way, the highest priority connection data does not starve the lower priority connection data. During one or more physical slots 306 in the frame 300, the CPE can transmit connection data that is not associated with the highest priority connection data. For example, if additional physical slots 306 are available in frame 300, the CPE can select the next highest priority connection data for transmission during the frame 300.

However, if the highest priority connection data exceeds the number of physical slots 306 allocated between the CPE and the base station in the frame 300, the CPE is unable to transmit all of the connection data to the base station during the frame 300. The CPE determines what connection data is transmitted during the current frame and any subsequent frames by utilizing a scheduling technique.

Examples of known scheduling techniques include weighted fair queuing (WFQ), round-robin (RR), weighted round robin (WRR), deficit round robin (DRR), and hierarchical round robin (HRR). The combination of the DRR and HRR schedulers forms the basis for a modified HRR scheduler. The modified HRR scheduler incorporates the deficit counters from the DRR scheduler.

These scheduling techniques provide a method for the CPE to select connection data from within a single class of service. When a communication system has more than one class of service, however, guaranteeing fairness and quality of service between different classes of service becomes more difficult.

To increase the fairness in communication systems that have different classes of service, the methods and systems disclosed herein prioritize connection data between classes of service. Two exemplary methods of prioritizing between classes of service include applying a strict priority or a modified strict priority.

Strict Priority—In strict priority, connections whose class of service has more demanding quality of service (QoS) requirements are selected from the buffer before other less demanding classes of service. For example, connections associated with demanding QoS requirements would be allocated physical slots 306 in frame 300 first (See FIG. 2). Only when these connections have had their demands met are lower classes of service selected from the queues. Thus, these lower classes of service would be allocated physical slots remaining in the frame 300 or in subsequent frames to the frame 300. This can be useful for guaranteeing very high QoS such as that required by CBR connections, but it may lead to starvation of low QoS service classes such as UBR.

Modified Strict Priority—Modified strict priority is basically applying WRR between different classes of service. Within a class of service, connection data that is associated with the class of service is allocated physical slots based on a specific class of service scheduling method and system. For example, DRR could be used. In this way, each class of service is limited to a predetermined percentage of the bandwidth available during the scheduling interval. This percentage is the weight this class of service has relative to the other classes of service. The scheduling interval could be one or more frames 300. When one class of service has exhausted its percentage of the available bandwidth or has no more demand, the scheduler moves to the next class of service.

Figure 3:
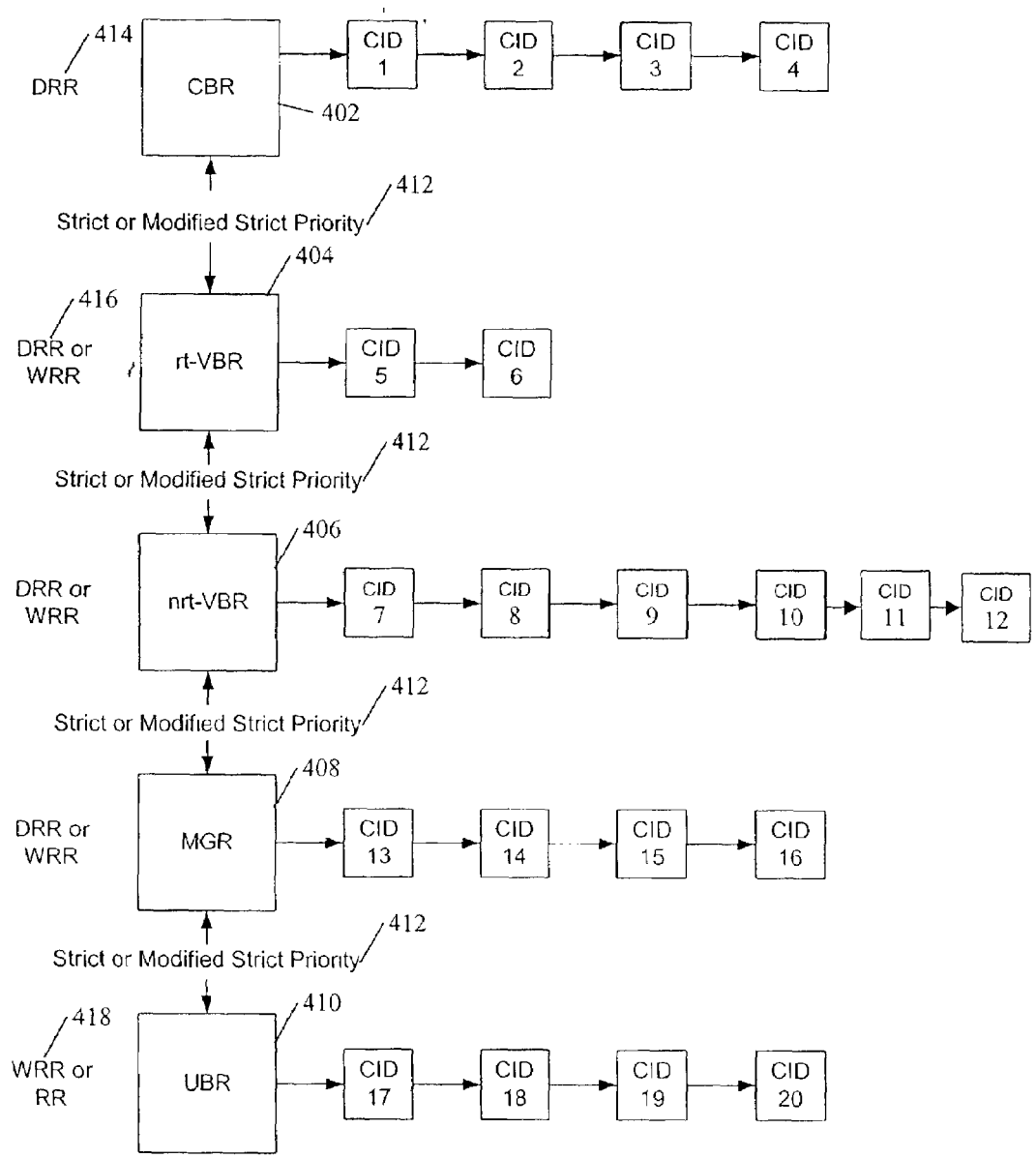
FIG. 3 is a flow diagram of an exemplary method for allocating bandwidth between connections that are associated with more than one class of service.

FIG. 3 is a flow diagram of an exemplary method utilized by a CPE to allocate bandwidth between connections that are associated with more than one class of service. These classes of service can include 1) CBR 402, 2) rt-VBR 404, 3) nrt-VBR 406, 4) MGR 408, and 5) UBR 410 classes of service. Additional or fewer classes of services can be used.

In FIG. 3 each row corresponds to one of the five classes of service. Each connection identification$_{1\text{-}20}$ (CIDs$_{1\text{-}20}$) is assigned to one of the rows or classes of service. In this example, CIDs$_{1\text{-}4}$ are identified as CBR connections 402. CIDs$_{5\text{-}6}$ are identified as rt-VBR connections 404. CIDs$_{7\text{-}12}$ are identified as nrt-VBR connections 406. CIDs$_{13\text{-}16}$ are identified as MGR connections 408. CIDs$_{17\text{-}20}$ are identified as UBR connections 410. The association of CIDs into groups does not limit the number of CIDs that can be associated with any class of service. Moreover, the selection of twenty CIDs in FIG. 3 was for convenience, as the methods and systems disclosed herein are not so limited. More or fewer CIDs can be associated with the CPE.

The different classes of services are initially ranked based on, for example, their QoS requirements. For example, the five exemplary classes of service are prioritized in the order CBR rt-VBR, nrt-VBR, MGR, and UBR from the top to the bottom of FIG. 3. Thus, the CBR 402 class of service generally has a higher priority than the rt-VBR 404 class of service.

Between each pair of adjacent classes of service, for example CBR 402 and rt-VBR 404, a specific priority is selected. This priority can include a strict priority or a modified strict priority 412. The priority that is applied between each pair of adjacent classes of service can be selected when the system is configured and can be changed at a later time. In FIG. 3 the possible priorities between each pair of adjacent classes of service are shown.

The priority between a pair of adjacent classes of service can be different than the priority selected between a different pair of adjacent classes of service. For example, strict priority could be selected between the CBR and the rt-VBR connections while modified strict priority is selected between rt-VBR and nrt-VBR connections. Each selected priority is used by the CPE employing the method when selecting from connection data that is associated with more than one class of service for transmission during a frame.

Within each row, or class of service, a round-robin technique is used to prioritize connection data from more than one CIDs where the more than one CIDs are associated with the same class of service. Exemplary known round-robin techniques include RR, WRR, and DRR. In the example of FIG. 3, DRR is used to prioritize connection data from CIDs$_{1\text{-}4}$. Since FIG. 3 is an exemplary method, the specific priority for the remaining classes of service is not indicated. FIG. 3 does show either a DRR or WRR technique 416 being selected for rt-VBR connections, nrt-VBR connections, and MGR connections. Either a WRR or RR 418 technique is used for UBR connections.

In implementation, the scheduling method employed by the CPE that is associated with $CIDs_{1-20}$ would first select connection data from the queues that are associated with the CBR connections for assignment to the uplink subframe 304. Deficit counters can be used between the $CIDs_{1-4}$ should one of the CIDs not receive its guaranteed bandwidth during the uplink subframe. Depending on whether strict priority or modified strict priority is applied, the relationship between the CBR and rt-VBR connections is defined. For example, if strict priority were selected, the CPE would select connection data from the buffer that is associated with the $CIDs_{1-4}$ before selecting connection data that is associated with $CIDs_{5-20}$. In prioritizing the connection data from the rest of the classes of service, a similar methodology is applied. Thus, the priority is selected between each pair of adjacent classes of service as well as the round robin technique to be employed within each class of service. Different classes of service can employ different round-robin techniques. The method of FIG. 3 has the disadvantage that fairness can only be approximated, especially when attempting to guarantee a committed rate for the MGR connections while not starving UBR connections.

To overcome the disadvantages of the method shown in FIG. 3, a scheduling method and system is described that schedules bandwidth between different classes of service by linking, or re-grouping, connection data from two or more classes of service. Linking allows the CPE to perform more than one pass over each class of service. During each pass, the CPE traverses the connection data via a list head for a class of service.

Figure 4:
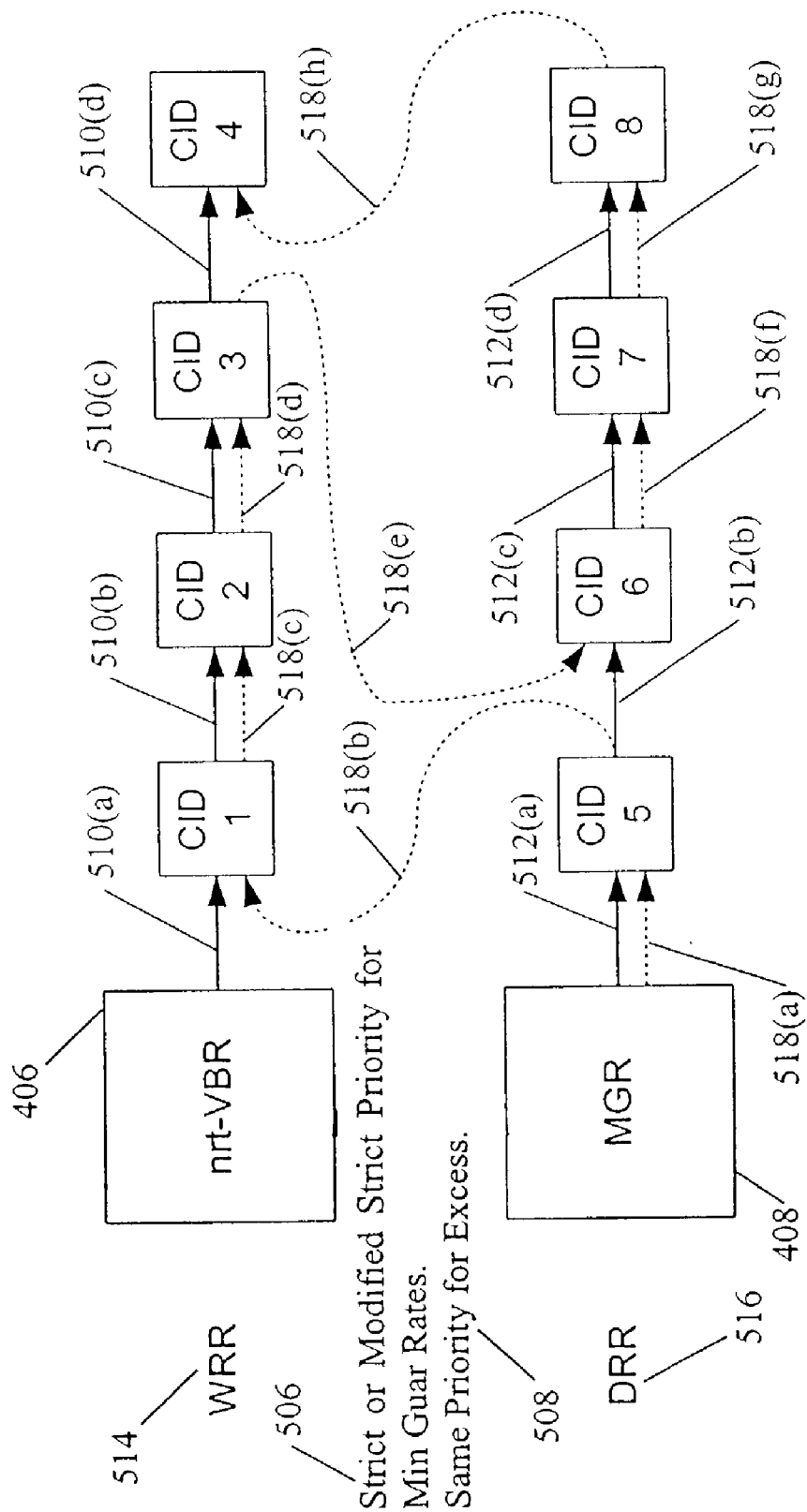
FIG. 4 illustrates an exemplary linking of two different classes of service for allocating excess bandwidth.

FIG. 4 illustrates an example of such linking of two different classes of service through a CPE. In this example, the first class of service, nrt-VBR 406, and the second class of service, MGR 408, are inked. Within the nrt-VBR 406 class of service, WRR 514 is selected for prioritizing connection data between $CIDs_{1-4}$. Within the MGR 408 class of service, DRR 516 is selected for prioritizing connection data between $CIDs_{5-8}$.

In the method shown in FIG. 4, both strict priority or modified strict priority 506 and same priority for excess 508 govern the relationship between the nrt-VBR 406 and the MGR 408 classes of service at different points in the allocation method. Strict priority or modified strict priority 506 is applied until the $CIDs_{1-8}$ each receive their minimum guaranteed rate in the frame. The minimum guaranteed rate can be based upon average or committed rates for one or more data units (bytes, ATM cells, etc.) which require some number of physical slots depending upon the PHY mode. If one or more physical slots are available after the connection data associated with $CIDs_{1-8}$ is allocated to the frame, these available physical slots are deemed excess. At this point in the allocation method, the method then logically re-groups the remaining connection data that is buffered in the buffer and that is associated with $CIDs_{1-8}$. The method then allocates the excess physical slots to this newly formed group by applying the same priority for excess 508.

In implementation, the CPE first traverses the nrt-VBR 406 class of service along the solid lines 510(a)–(d) in FIG. 4. In this way, the CPE selects connection data from the queues that are associated with $CIDs_{1-4}$. This first pass schedules up to the average or committed rates for the $CIDs_{1-4}$ based on the $CIDs_{1-4}$ demands. In the example shown in FIG. 4, WRR 514 is applied. This is accomplished by ignoring the excess demand of the $CIDs_{1-4}$ and the demands of the MGR 408 class of service. Thus, at this point in the allocation method, strict or modified strict priority is applied between the nrt-VBR 406 class of service and the MGR class of service 408.

If physical slots remain in this scheduling interval or frame, the CPE would traverse the solid lines 512(a)–(d) of the MGR 408 connections using DRR 516. The CPE schedules demand for the average or committed rates for the $CID_{5-8}$ while ignoring any excess demand. Finally, if there is one or more physical slot remaining in the frame, the scheduler traverses the dashed lines 518(a)–(h). Thus, at this point in the allocation method, the same priority for excess 508 is applied between the nrt-VBR 406 class of service and the MGR class of service 408. For example, WRR is applied between the $CIDs_{1-8}$ for allocating the excess physical slots. The order in which the method visits each CID to schedule excess is shown to be $CID_5$, $CID_1$, $CID_2$, $CID_3$, $CID_6$, $CID_7$, $CID_8$, and $CID_4$. However, any order can be used. For example, the order could be the order in which the connections were established. This order is then reflected in the order that the connections are linked into the data structures for the methods.

Figure 5:
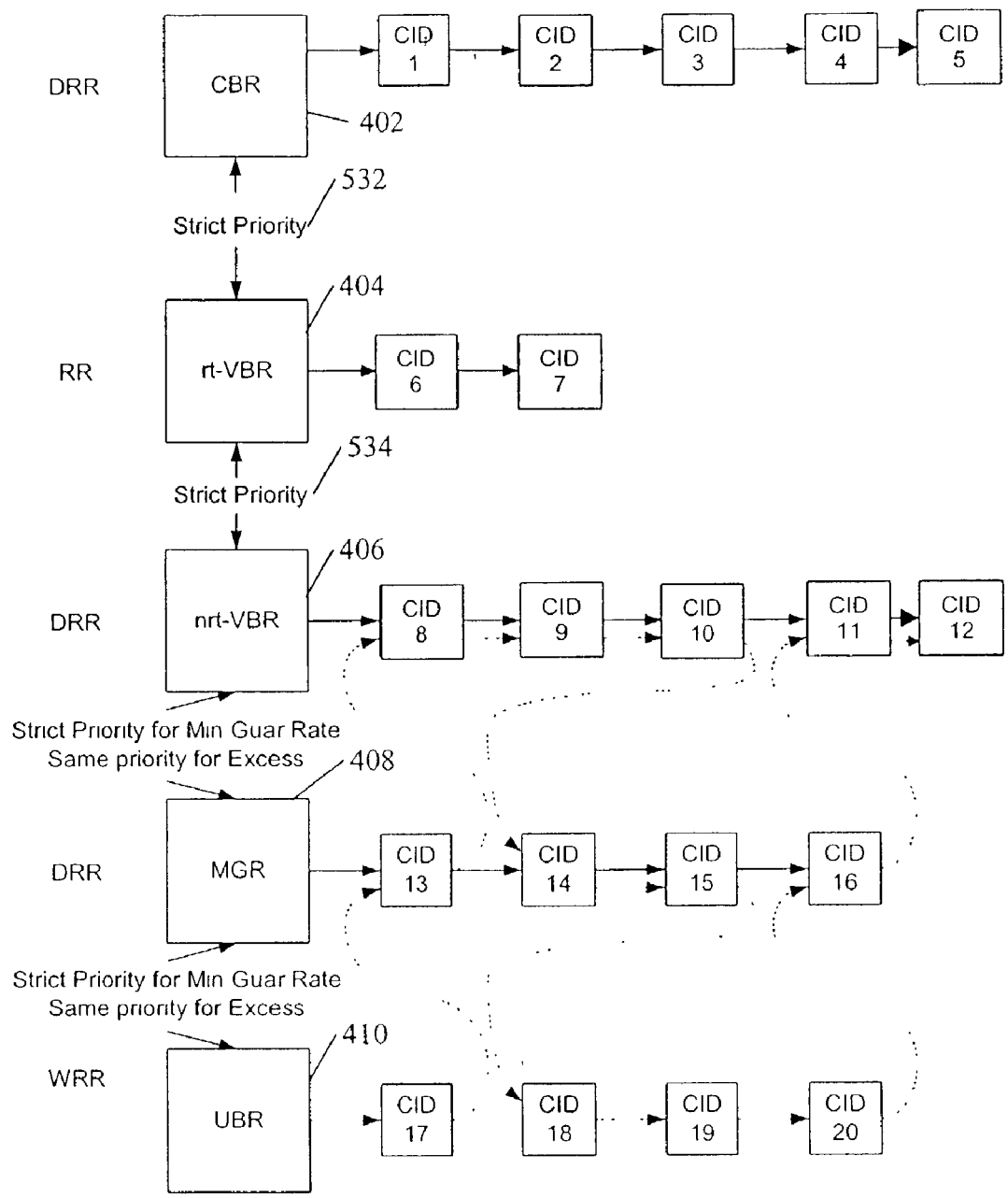
FIG. 5 is a diagram of a flow diagram for allocating bandwidth between connections that are associated with five classes of service where three classes of service are linked during a second pass.

FIG. 5 is a flow diagram for allocating bandwidth between connections that are associated with five classes of service where three classes of service are linked during a second pass. The five classes of service are 1) CBR 402, 2) rt-VBR 404, 3) nrt-VBR 406, 4) MGR 408, and 5) UBR 410 classes of service. Additional or fewer classes of services can be used. The three classes of service that are linked in FIG. 5 are the nrt-VBR 406, MGR 408, and UBR 410 classes of service. Additionally, the rt-VBR class, or any other class of service that include the concept of guaranteed and excess bandwidth could be linked.

The five classes of service are arranged in five horizontal rows, with each row corresponding to one of the five classes of service. Each connection identification$_{1-20}$ ($CIDs_{1-20}$) is assigned to one of the rows or classes of service. In this example, $CIDs_{1-5}$ are identified as CBR connections 402. $CIDs_{6-7}$ are identified as rt-VBR connections 404. $CIDs_{8-12}$ are identified as nrt-VBR connections 406. $CIDs_{13-16}$ are identified as MGR connections 408. $CIDs_{17-20}$ are identified as UBR connections 410. The association of CIDs into groups does not limit the number of CIDs that can be associated with any class of service. Moreover, the selection of twenty CIDs in FIG. 5 was for convenience, as the methods and systems disclosed herein are not so limited. More or fewer CIDs can be associated with the CPE.

The different classes of services are initially ranked based on, for example, their unique bandwidth requirements. For example, the five exemplary classes of service are prioritized in the order CBR, rt-VBR, nrt-VBR, MGR, and UBR from the top to the bottom of FIG. 5. Thus, the CBR 402 class of service generally has a higher priority than the rt-VBR 404 class of service.

Between each pair of adjacent classes of service, for example CBR 402 and rt-VBR 404, a specific priority is selected. For example, strict priority 532, 534 was selected between the CBR 402 and rt-VBR 404 classes of service as well as between the rt-VBR 404 and nrt-VBR 406 classes of service. Alternatively, modified strict priority could have been chosen between any two classes of service. The priority selected between a pair of adjacent classes of service can be different than the priority selected between a different pair of adjacent classes of service.

Within each row, or class of service, a round-robin technique is selected to prioritize connection data from more than one CIDs where the more than one CIDs are associated with the same class of service. In FIG. 5, the CPE selected DRR to prioritize connection data from $CID_{1-5}$, $CIDs_{8-12}$, and $CIDs_{13-16}$. Round robin was selected for $CIDs_{6-7}$. Weighted round robin was selected for $CIDs_{17-20}$.

In FIG. 5, the excess demand of nrt-VBR 406 and MGR 408 connections is not only grouped with each other as described in FIG. 4 for a second pass, but is also linked in with demands of UBR connections 410. Since generally UBR connections have no guaranteed data rate, the entire peak rate of a UBR connection is treated as excess. Since the entire peak rates of the UBR connections are treated as excess, a first pass by the methods disclosed herein is unnecessary for the UBR connections. In this way, the connection data associated with $CIDs_{8-20}$ in the buffer are re-grouped for allocation to the excess physical slots in the frame. In the embodiment of FIG. 5, a WRR technique can be applied to select from this buffer during the second pass. This ensures that excess demand of nrt-VBR 406 and MGR 408 connections will not starve lower classes of service through the CPE. It also ensures that UBR 410 connections will not starve the excess demand, for example, demand that is greater than committed but less than peak, of the higher classes of service. Using WRR for the second pass allows a further prioritization between the connections themselves in these classes of service. For example, each connection may have a weight that is a function of the excess demand, i.e., the difference between the guaranteed rate and the peak rate.

The selection of the classes of service, the priority between the classes of service for guaranteed rates as well as for the excess, the number of CIDs, the priority technique within a class of service, and the priority technique between a mixed class of services were selected only as examples. This disclosure is not limited by the examples described herein.

The committed or average rates for one or more classes of service can be allocated with strict priority relative to each other while the excess demand of one or more classes of service can be allocated as if they were in the same class of service. By linking the nrt-VBR 406, MGR 408, and UBR 410 classes of service in this way, the excess demand of the higher classes of service, for example nrt-VBR 406, does not starve the lower classes of service, MGR 408 and UBR 410. To increase the effectiveness of the linking, the committed or average rate of the higher classes of service is not over subscribed. If the higher class of service is oversubscribed, the lower class of service can still starve. Examples of methodology that can be used by the scheduling method and system are disclosed below.

A first example applies strict priority or modified strict priority between classes of service for minimum guaranteed rates while ensuring that excess demand in a higher class of service does not starve a lower class of service. This example was described in FIG. 4. A second example applies optional strict priority between classes of service for average rates while ensuring that excess demand in a higher class of service does not starve a lower class of service. A third example applies excess demand to be allocated at the same priority as excess demand of a lower class of service. A fourth example applies excess demand to be allocated at the same priority as committed or average rates of a lower class of service. A fifth example applies different scheduling methods and systems (DRR, WRR, WFQ, etc.) for a class of service's minimum guaranteed rates and excess demand. A sixth applies different scheduling methods and systems (DRR, WRR, WFQ, etc.) for a class of services average rates and excess demand. All of the examples are not described in detail, as one of skill in the art will be able to implement these variations based on the included detail examples.

Different scheduling methods and systems can also be chosen for each of the scheduling passes. In one embodiment, modified strict priority is used between the two classes of service. The CPE contains the appropriate fields for keeping track of the demand as well as weights and counters for two different scheduling methods and systems. When the excess is scheduled, it may or may not count against the committed rate.

An analytical example of a CPE applying an allocation method that links classes of service will now be described. The CPE groups and re-groups the classes of service whereby classes of service become linked. The CPE in this example uses multiple mini-cycles to schedule connection data from its buffer for transmission during a series of uplink subframes.

The five exemplary classes of service, CBR, rt-VBR, nrt-VBR, MGR, and UBR are analytically described below. For ease of description, notation from ATM is used in the example since ATM has a well-developed description of QoS. Alternatively, the methods and systems described herein are applied to a packet-based scenario such as TCP/IP. Let R denote a wireless link rate for the communication link between the CPE and base station.

CBR:

Let $S_{CBR}$ denote the set of CBR connections.

Let $N_{CBR}$ denote the number connections in $S_{CBR}$.

We assume that PCR ($r_{CBR,i}$) is allocated for each connection $i \in S_{CBR}$.

Let $$r_{CBR} = \sum_{i=1}^{N_{CBR}} r_{CBR,i}$$

denote the total bandwidth allocated for $S_{CBR}$.

rt-VBR:

Let $S_{rt\text{-}VBR}$ denote the set of rt-VBR connections.

Let $N_{rt\text{-}VBR}$ denote the number connections in $S_{rt\text{-}VBR}$.

We assume that effective bandwidth ($r_{rt\text{-}VBR,i}$) is calculated for each connection $i \in S_{rt\text{-}VBR}$, and $r_{rt\text{-}VBR,i}$ is allocated for connection $i \in S_{rt\text{-}VBR}$.

Let $$r_{rt\text{-}VBR} = \sum_{i=1}^{N_{rt\text{-}VBR}} r_{rt\text{-}VBR,i}$$

denote the total bandwidth allocated for $S_{CBR}$.

nrt-VBR:

Let $S_{nrt\text{-}VBR}$ denote the set of nrt-VBR connections.

Let $N_{nrt\text{-}VBR}$ denote the number connections in $S_{nrt\text{-}VBR}$.

We assume that $r_{nrt\text{-}VBR,i} = r_{nrt\text{-}VBR,i}^G + r_i^E$ is allocated for each connection $i \in S_{nrt\text{-}VBR}$, where $r_{nrt\text{-}VBR,i}^G = SCR_i$ is the guaranteed allocation, and $r_i^E = (R - r_{CBR} - r_{rt\text{-}VBR} - r_{nrt\text{-}VBR}^G - r_{MGR}^G) \cdot w_i$ is the fair portion of the excess bandwidth.

Let $$r^G_{nrt\text{-}VBR} = \sum_{i=1}^{N_{nrt\text{-}VBR}} r^G_{nrt\text{-}VBR,i}$$

denote the total guaranteed bandwidth allocated for $S_{nrt\text{-}VBR}$.

Let $r^P_{nrt\text{-}VBR_i} = PCR_i$ denote the peak rate for $i \in S_{nrt\text{-}VBR}$.

MGR:

Let $S_{MGR}$ denote the set of MGR connections.

Let $N_{MGR}$ denote the number connections in $S_{MGR}$.

We assume that $r_{MGR,i} = r^G_{MGR,i} + r^E_i$ is allocated for each connection $i \in S_{MGR}$, where $r^G_{MGR,i} = MCR_i$ is the guaranteed allocation, and $r^E_i = (R - r_{CBR} - r^G_{nrt\text{-}VBR} - r^G_{MGR}) \cdot W_1$ is the fair portion of the excess bandwidth.

Let $$r^G_{MGR} = \sum_{i=1}^{N_{MGR}} r^G_{MGR,i}$$

denote the total guaranteed bandwidth allocated for $S_{MGR}$.

Let $r^P_{MGR_i} = PCR_l$ denote the peak rate for $i \in S_{MGR}$.

UBR:

Let $S_{UBR}$ denote the set of UBR connections.

Let $N_{UBR}$ denote the number connections in $S_{UBR}$.

We assume that $r_{UBR,i} = r^E_i$ is allocated for each connection $i \in S_{UBR}$, where $r^E_i = (R - r_{CBR} - r_{rt\text{-}VBR} - r^G_{nrt\text{-}VBR} - r^G_{MGR}) \cdot w_l$ is the fair portion of the excess bandwidth.

Where $w_l$ is:

For simple round robin case $$w_i = \frac{1}{(N_{nrt\text{-}VBR} + N_{MGR} + N_{UBR})}.$$

For weighted round robin for nrt-VBR connections, $$w_i = \frac{r^P_{nrt\text{-}VBR_i} - r^G_{nrt\text{-}VBR_i}}{\sum_{i=1}^{N_{nrt\text{-}VBR}}(r^P_{nrt\text{-}VBR_i} - r^G_{nrt\text{-}VBR_i}) + \sum_{i=1}^{N_{MGR}}(r^P_{nrt\text{-}VBR_i} - r^G_{nrt\text{-}VBR_i}) + \sum_{i=1}^{N_{UBR}}(r_{UBR_i})}$$

For weighted round robin for MGR connections, $$w_i = \frac{r^P_{MGR_i} - r^G_{MGR_i}}{\sum_{i=1}^{N_{nrt\text{-}VBR}}(r^P_{nrt\text{-}VBR_i} - r^G_{nrt\text{-}VBR_i}) + \sum_{i=1}^{N_{MGR}}(r^P_{nrt\text{-}VBR_i} - r^G_{nrt\text{-}VBR_i}) + \sum_{i=1}^{N_{UBR}}(r_{UBR_i})}.$$

For weighted round robin for UBR connections, $$w_i = \frac{r_{UBR_i}}{\sum_{i=1}^{N_{nrt\text{-}VBR}}(r^P_{nrt\text{-}VBR_i} - r^G_{nrt\text{-}VBR_i}) + \sum_{i=1}^{N_{MGR}}(r^P_{nrt\text{-}VBR_i} - r^G_{nrt\text{-}VBR_i}) + \sum_{i=1}^{N_{UBR}}(r_{UBR_i})}.$$

In this example, the CPE utilizes three levels of service lists. The three service lists are identified below as $C_1$, $C_2$, and $C_3$ Let $C_l$ denote the l-th level service list, where $l \in \{1,2,3\}$.

$C_1 = S_{CBR} \cup S_{rt\text{-}VBR}$ $C_2 = S_{nrt\text{-}VBR} \cup S_{GFR}$ which is the hard commitment portion for the connections associated with the $C_2$ service list. When a connection does not use its hard commitment portion within a given frame, that connection may, or may not, receive a credit for the unused hard commitment portion of the frame. The credit allows the connection to receive additional bandwidth above its hard commitment portion in a future frame. Alternatively, only a portion of the unused hard commitment portion of the frame is credited to the connection for use in a future frame.

$C_3 = S_{nrt\text{-}VBR} \cup S_{GFR} \cup S_{UBR}$ is the soft commitment portion for the connections associated with the $C_3$ service list.

Each service list includes one or more classes of service. Strict priority is applied between $C_1$ and $C_2$. Alternatively, modified strict priority could have been used. Thus connection data that is associated with $C_2$ is not selected for a frame until the connection data associated with $C_1$ is satisfied. Strict priority is also applied between $C_2$ and $C_3$. Thus connection data that is associated with $C_3$ is not selected until the demand from connection data that is associated with $C_2$ is satisfied.

In this example, the $C_1$ and $C_2$ service lists do not include connections that are associated with the same class of service. The $C_1$ service list is the union of connections that are associated with the CBR and rt-VBR classes of service. The $C_2$ service list is the union of connections that are associated with the nrt-VBR and GFR classes of service. The $C_3$ service list includes the classes of service that are associated with the $C_2$ service list along with the UBR class of service.

In this example, the CPE maintains three service lists of round robin mini-cycles one for each service list.

When the base station is applying the methods and systems described herein to a downlink subframe or to allocation across multiple CPEs in an uplink, the base station normalizes its buffered data depending on the modulation that is associated with the recipient CPEs. In this way, the wireless link rate for data transmitted from the base station to the CPEs is normalized to a single modulation technique. For example, the link rates could be normalized to QAM-64. Thus, bandwidth associated with connection data that is transmitted using QAM-16 is multiplied by a factor of 1.5. For bandwidth associated with connection data that is transmitted using QAM-4, the connection data is multiplied by a factor of 3. Another modulation could be selected to normalize the different modulations. Alternatively, the transmission rate may be normalized to Physical layer units, such as modulation symbols, to allow adaptive FEC as well as adaptive modulation. In contrast, the CPE uses a single modulation technique for its uplink subframe and thus normalization is not required.

A list of the connection identification (CID) for each of the three service lists introduced above, $C_1$, $C_2$, and $C_3$, is described below.

Let $C_1 = \{CID_1, CID_2\}$.
Let $C_2 = \{CID_3, CID_4\}$.
Let $C_3 = \{CID_3, CID_4, CID_5, CID_6\}$.

Following this example, the connection data that is associated with $CID_1$ or $CID_2$ is assigned to one of two classes of service, CBR and rt-VBR. The connection data that is associated with $CID_3$ or $CID_4$ is assigned to one of two classes of service, nrt-VBR and GFR. The third service list includes connection data that is associated with $CID_3$ and $CID_4$ along with the connection data that is associated with $CID_5$ and $CID_6$. Thus, based on the service list definitions given above, $CID_5$ and $CID_6$ are UBR connections. In this example, connection data associated with $CID_3$ and $CID_4$ can be selected for transmission by the CPE from two of the three service lists.

An example of normalized physical slot allocations are given in TABLE A below. TABLES A includes the service lists, slot allocations, and slot allocation cap maximums that are associated with each $CID_{1-6}$. The slot allocation cap limits the maximum number of unused slots that a CID can carryover from a previous data block. These exemplary values defined in TABLE A will be applied to two uplink data blocks below. The base station can allocate a different number of physical slots to a CPE from one frame to the next frame. In this example, the CPE has been allocated twenty slots in the first data block and eighteen slots in the second data block. In general, the CPE selects connection data from a buffer which includes queues for connection data from $CIDs_{1-6}$. The CPE then applies the modified HRR scheduler in conjunction with the slot allocations defined in TABLE A to prioritize its transmission of the connection data.

TABLE A

|  | CID # | Slot Allocation | Slot Allocation Cap |
|---|---|---|---|
| Service List C1 | 1 | 2 | 2 |
|  | 2 | 4 | 4 |
| Service List C2 | 3 | 6 | 12 |
|  | 4 | 9 | 18 |
| Service List C3 | 3 | 6 | 8 |
|  | 4 | 6 | 8 |
|  | 5 | 12 | 20 |
|  | 6 | 12 | 20 |

Figure 6:
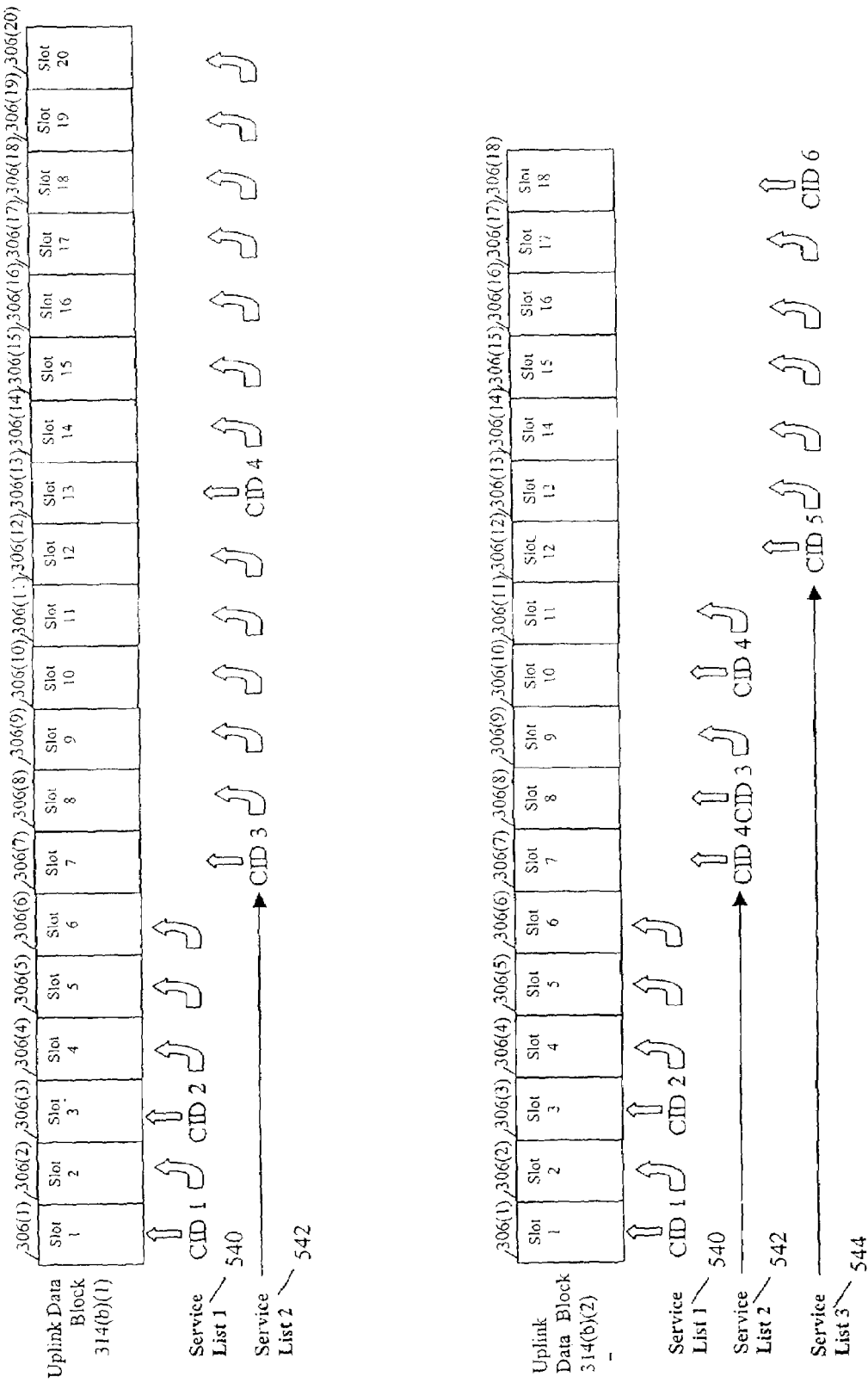
FIG. 6 is an illustration of two uplink data blocks from a series of uplink subframes that are scheduled using a Hierarchical Round Robin (HRR) technique with three round robin mini-cycles.

FIG. 6 is an illustration of uplink data blocks 314(*b*)(1), 314(*b*)(2), each from a different uplink subframe 304 (see FIG. 2). CPE 104(*b*) utilizes uplink data block 314(*b*) for transmissions to the base station 102 (see FIG. 1). Only uplink data blocks 314(*b*)(1), 314(*b*)(2) are shown for ease of description. However, additional uplink data blocks from additional subframes 304 may be used. Each uplink data block 314(*b*)(1), 314(*b*)(2) includes one or more physical slots 306. For ease of description, the first uplink data block 314(*b*)(1) includes twenty physical slots 306(1)–306(10). The second uplink data block 314(*b*)(2) includes eighteen physical slots 306(1)–306(18). More or less physical slots could be used. As illustrated in FIG. 6, the number of slots within a series of uplink data blocks 314(*b*)(1), 314(*b*)(2) can vary from frame to frame. Thus, both the size of the uplink subframe 304 and the size of the uplink data block 314 allocated to a particular CPE 104 can change from frame to frame.

The CPE 104(*b*) transmits connection data to the base station during the twenty physical slots and the eighteen physical slots. In FIG. 6, the order of transmission for the connection data associated with $CID_{1-6}$ begins with the uplink data block 314(*b*)(1) and ends with the uplink data block 314(*b*)(2). Thus, CPE 104(*b*) (see FIG. 1) transmits connection data during uplink data block 314(*b*)(2) after it transmits connection data during the uplink data block 314(*b*)(1).

The uplink data blocks 314(*b*)(1), 314(*b*)(2) are scheduled using a Hierarchical Round Robin (HRR) technique with three round robin mini-cycles. In FIG. 6, the uplink data blocks 314(*b*)(1), 314(*b*)(2) are utilized by CPE 104(*b*) with six connections, 113(*c*)–(*h*) (see FIG. 1). In FIG. 6, the connections 113(*c*)–(*h*) from FIG. 1 correspond to connection identifications ($CID_{1-6}$) in FIG. 6. Thus, connection 113(*c*) corresponds to $CID_1$, connection 113(*d*) corresponds to $CID_2$, connection 113(*e*) corresponds to $CID_3$, connection 113(*f*) corresponds to $CID_4$, connection 113(*g*) corresponds to $CID_5$, and connection 113(*h*) corresponds to $CID_6$. Further, the six connections are assumed to be backlogged through the CPE 104(*b*).

The CPE 104(*b*) utilizes three round-robin mini-cycles during each uplink data block 314 for its transmission of connection data to the base station. Each round-robin mini-cycle corresponds to one of the service lists shown in TABLE A. For example, the first round-robin mini-cycle corresponds to service list C1 540 from TABLE A. The second round-robin mini-cycle corresponds to service list C2 542 from TABLE A. The third round-robin mini-cycle corresponds to service list C3 544 from TABLE A. The order of transmission in each physical slot 306 of uplink data blocks 314(*b*)(1), 314(*b*)(2) will now be described.

An initial picture of the queues for the CPE is shown below. Table B includes a tally of the connection data in the queues and the service list deficit counters for each CID. In one embodiment, the methods and systems comprise separate deficit counters for the hard and soft commitments for $CIDs_{3-4}$.

TABLE B

|  | Connection data in queue | Service List C2 deficit counter | Service List C3 deficit counter |
|---|---|---|---|
| CID1 | 2 | N/A | N/A |
| CID2 | 4 | N/A | N/A |
| CID3 | 7 | 0 | 0 |
| CID4 | 10 | 0 | 0 |
| CID5 | 5 | N/A | 0 |
| CID6 | 5 | N/A | 0 |

During the first mini-cycle for uplink data block 314(*b*)(1), the CPE first selects from its queues connection data that is associated with $CID_1$ for transmission during physical slots 306(1) and 306(2) of uplink data block 314(b)(1) as prescribed in TABLE A above. Next, the CPE selects from its queues connection data that is associated with $CID_2$ for transmission during physical slots 306(3) through 306(6) of uplink data block 314(b)(1). $CIDs_{1-2}$ have now been allocated their maximum assigned physical slots for uplink data block 314(b)(1). The CPE now proceeds to the second round-robin mini-cycle.

During the second mini-cycle for uplink data block 314(b)(1), the CPE first selects from its queues connection data that is associated with $CID_3$ for transmission during physical slots 306(7)–306(12) as prescribed in row 2 of TABLE A above. Next, the CPE selects from its queues connection data that is associated with $CID_4$ for transmission during the physical slots of uplink data block 314(b)(1). Per TABLE A, the CPE can allocate up to nine physical slots for transmitting connection data that is associated with $CID_4$ during any given uplink data block. However, time is only available during physical slots 306(13)–(20) of uplink data block 314(b)(1) for transmission of eight physical slots of connection data associated with $CID_4$. Thus, any additional connection data for $CID_4$ that is buffered in the CPE's queue for $CID_4$ is not transmitted during uplink data block 314(b)(1). However, the CPE stores in a deficit counter for $CID_4$ that $CID_4$ only received eight physical slot of uplink data block 314(b)(1). Moreover, since the twenty physical slots of uplink data block 314(b)(1) have been filled, no more connection data is allocated for transmission during uplink data block 314(b)(1). The connection data associated with uplink data block 314(b)(1) is transmitted to the base station.

A picture of the queues after transmission of the uplink subframe 304(a) is shown below. New connection data received since the allocation for the first uplink subframe is shown in brackets.

TABLE C

|  | Connection data in queue | Service List C2 deficit counter | Service List C3 deficit counter |
| --- | --- | --- | --- |
| CID1 | 0 + [2] | N/A | N/A |
| CID2 | 0 + [4] | N/A | N/A |
| CID3 | 1 + [1] | 0 | 6 |
| CID4 | 2 + [1] | 1 | 6 |
| CID5 | 5 + [1] | N/A | 12 |
| CID6 | 5 + [5] | N/A | 12 |

Next, the CPE selects connection data from the queues to transmit during uplink data block 314(b)(2). This buffered data can include connection data that was not selected by the CPE for transmission during uplink data block 314(b)(1). As shown in TABLE C, additional connection data arrived from the connections since allocating connection data to uplink data block 314(b)(1).

The CPE begins again with the first round-robin mini-cycle. During the first mini-cycle for uplink data block 314(b)(2), the CPE first selects from its queues connection data that is associated with $CID_1$ for transmission during physical slots 306(1) and 306(2) of uplink data block 314(b)(2) as prescribed in TABLE A above. Next, the CPE selects from its queues connection data that is associated with $CID_2$ for transmission during physical slots 306(3) through 306(6) of uplink data block 314(b)(2). $CIDs_2$ have now been allocated their maximum assigned physical slots for uplink data block 314(b)(2). The CPE now proceeds to the second round-robin mini-cycle.

During the second mini-cycle for uplink data block 314(b)(2), the CPE selects from its queues connection data that is associated with $CID_4$ rather than from $CID_3$. The CPE selects $CID_4$ since the deficit counter in TABLE C for $CID_4$ indicates that $CID_4$ only received eight physical slots in uplink data block 314(b)(1). Connection data associated with $CID_4$ is thus set to be transmitted by the CPE during physical slot 306(7) of uplink data block 314(b)(2). The CPE then zeros the deficit counter for $CID_4$. At this point the allocation continues with the next service, $CID_3$, in Service list 2 using the sum of the deficit counter and the new slot allocation for this frame. The CPE now allocates physical slots 306(8) and 306(9) to $CID_3$. Since no more connection data resides in the $CID_3$ queue, $CID_3$ receives a credit for its unused portion of the uplink subframe 304(b). This credit is reflected in TABLE D as 4 slots of connection data.

The CPE now allocates physical slot 306(10) and 306(11) to $CID_4$. Since no more connection data resides in the $CID_4$ queue, $CID_4$ receives a credit for its unused portion of the uplink subframe 304(b). This credit is reflected in TABLE D as seven slots of connection data.

TABLE D

|  | Connection data in queue | Service List C2 deficit counter | Service List C3 deficit counter |
| --- | --- | --- | --- |
| CID1 | 0 | N/A | N/A |
| CID2 | 0 | N/A | N/A |
| CID3 | 0 | 0 + [4] | 6 |
| CID4 | 0 | 0 + [7] | 6 |
| CID5 | 5 + [1] | N/A | 12 |
| CID6 | 5 + [5] | N/A | 12 |

The CPE has now completed the second round-robin mini-cycle as described in TABLE A. The state of the queues and counters at the end of this mini-cycle is shown in TABLE D. However, the physical slots 306(12)–306(18) of uplink subframe 304(b) are still available.

The CPE moves to the third round-robin mini-cycle as described in TABLE A above for completing the uplink data block 314(b)(2). During the third mini-cycle for uplink data block 314(b)(2), the CPE selects connection data that is associated with $CIDs_{3-6}$. In this example, the CPE visits the CIDs in numerical order. Thus, the CPE will progress from $CID_3$ to $CID_4$, to $CID_5$ and finally to $CID_6$ during the third round-robin mini-cycle. Per TABLE A, the CPE can allocate up to six physical slots for transmitting connection data that is associated with $CID_3$ during any given uplink data block per the third round-robin mini-cycle. But, in this case, $CID_3$ has no data remaining to be transmitted, so its service list 3 deficit counter is credited, up to the slot allocation cap for this counter. Since the deficit counter is already at 6, adding 6 additional slots causes it to surpass its cap of 8 thus, it is set to 8 rather than to 12. Similarly, there is no connection data that is associated with $CID_4$ for transmission during this mini-cycle. Next, the CPE selects from its queues connection data that is associated with $CID_5$ for transmission during physical slot 306(12) through 306(17) of uplink data block 314(b)(2). At this point in the example, six PS of data are in the queue associated with $CID_5$. Per TABLE A, the CPE can allocate up to twelve physical slots for transmitting connection data that is associated with $CID_5$ during any given uplink subframe per the third round-robin mini-cycle. This leaves one slot available for $CID_6$ data which is placed in slot 306(18). Since the eighteen physical slots of uplink data block 314(b)(2) have been filled, no more connection data is allocated for transmission during uplink data block 314(b)(2). The connection data associated with uplink data block 314(b)(2) is transmitted to the base station. Since no data was transmitted in mini-cycle 3 for $CID_3$ or $CID_4$, their service list 2 allocation is added to their deficit points, up to their slot allocation cap for service list 2. Since data was transmitted for $CID_5$ and $CID_6$, the amount allocated is first subtracted from their slot allocation before it is added to their deficit pointers.

TABLE E

| Connection data in queue | Service List C2 deficit counter | Service List C3 deficit counter |
|---|---|---|
| CID1 | 0 | N/A | N/A |
| CID2 | 0 | N/A | N/A |
| CID3 | 0 | 0 + [4] | MIN(8, 6 + 6) = 8 |
| CID4 | 0 | 0 + [7] | MIN(8, 6 + 6) = 8 |
| CID5 | 0 | N/A | MIN(20, 12 − 5 + 12) = 19 |
| CID6 | 9 | N/A | MIN(20, 12 − 1 + 12) = 20 |

The final status of the queues at the end of subframe 304(*b*) is shown in TABLE E.

Additional uplink transmission frames after the two uplink transmission frames 302 are not described as one of skill in the art will be able to extrapolate from the discussion above to determine the subsequent priorities of the connection data.

Figure 7:
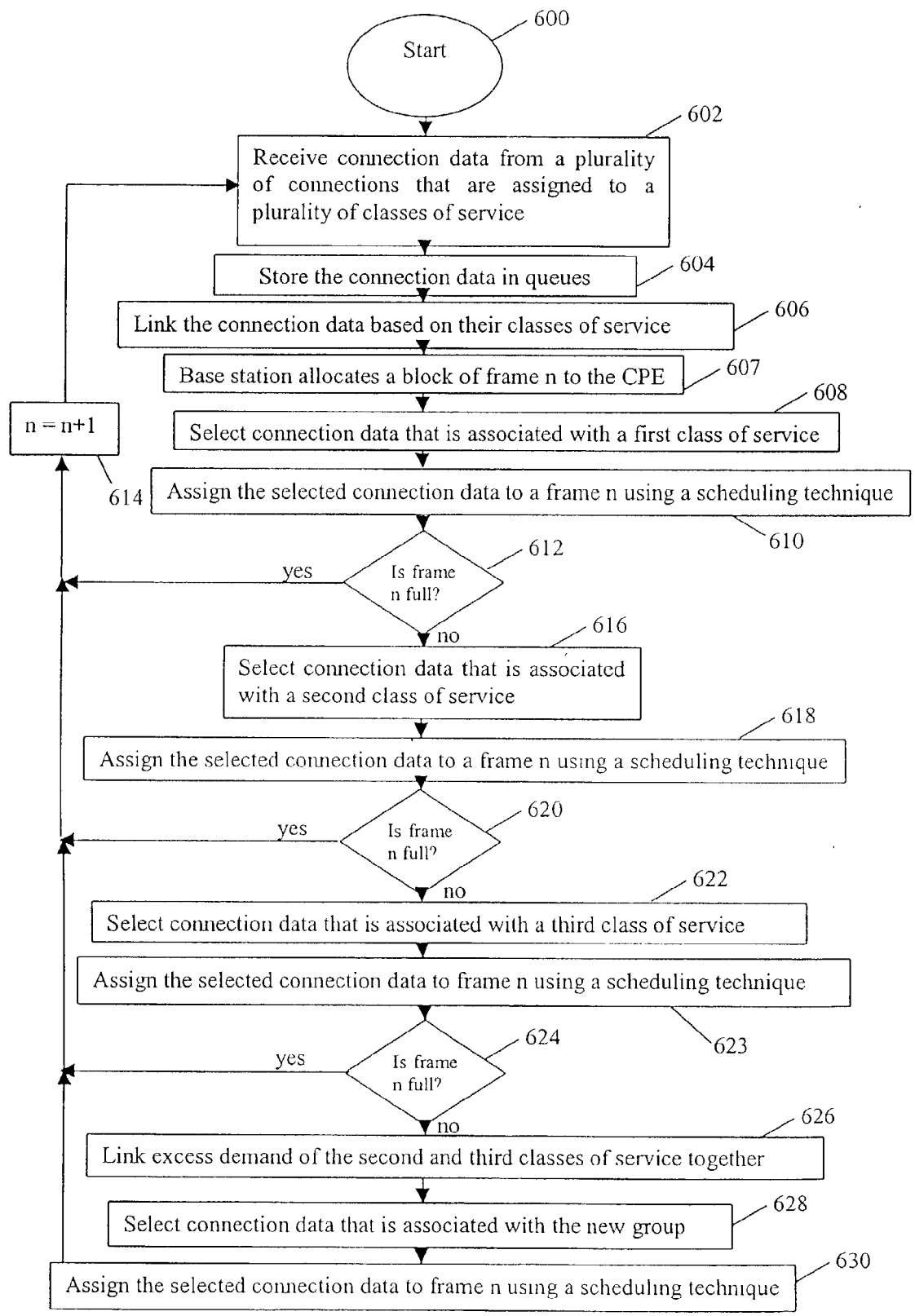
FIG. 7 is a flowchart illustrating the process of scheduling connection data that is associated with more than one class of service by the CPE.

FIG. 7 is a flowchart illustrating the process of scheduling connection data associated with more than one class of service by the CPE. The connection data is logically linked by one or more classes of service (CoS). For example, the process logically links the connections that are associated with a first class of service and links the connections that are associated with a second class of service. As explained all of the connections can be associated with one or more classes of service. Once a CPE's connections are linked, that CPE applies the methods and systems disclosed herein to prioritize the linked connection is as well as the data in the queues for each connection. Once prioritized, the CPE traverses the linked connections to systematically select connection data from their queues for transmission. In this way, the CPE improves the allocation fairness among the different classes of service.

The queues associated with the classes of service continually receive new connection data from the connections. In response, the CPE is configured to continuously, or periodically, re-prioritize the data in the queues for the connections. For example, re-prioritizing can be performed after each transmission frame is filled. Alternatively, or in addition to prioritizing after each transmission frame, the CPE can prioritizing the connection data while the transmission frame is being filled. For example, the CPE can re-prioritizing the connection data at the completion of, or in parallel with, a mini-cycle. For ease of explanation, the method described in connection with FIG. 7 re-prioritizes the connection data after each transmission frame. However, as explained above, the methods and systems are not so limited.

This process can be implemented by the CPE for the uplink subframes. This process can also be performed by the base station for the downlink subframes. The process can be further performed by the CPE in conjunction with the base station. The process can also be performed by the BS for uplink bandwidth allocation across the entire set of CPEs.

The following exemplary description describes a process for scheduling connection data that is associated with three classes of service by a CPE. The description assumes strict priority between the classes. One skilled in the art could see how modified strict priority could be used instead. The same process is used for scheduling connection data that is associated with three classes of service by the base station.

In particular, flow begins in start block 600. Flow moves to a block 602 where the CPE receives connection data from a plurality of connections. The plurality of connections is assigned to a plurality of classes of service. Flow proceeds to block 604, where the connection data is stored in queues at the CPE. Continuing to block 606, the CPE logically links the connection data based on the class of service associated with the connection data. Next at decision block 607, the CPE awaits scheduling information from the base station. Next at decision block 608, the CPE selects the connection data that is associated with a first class of service. Flow continues to a block 610 where the CPE assigns the selected connection data to a frame using a scheduling technique. The scheduling technique is used to prioritize the connections within the first class of service. The scheduling technique can be, for example, RR, WRR, or DRR. Flow moves to a decision block 612 where the CPE determines whether the frame is full. If the frame is full, the process continues to a block 614 where the frame count is incremented by one. Flow then returns to blocks 602 to 606 as described above. Next, at the block 607, the CPE awaits another allocation for frame n+1 from the base station. Flow proceeds to block 608 where the CPE selects additional connection data from the buffer that is associated with the first class of service. Flow continues to the block 610 where the CPE assigns the selected connection data to frame n+1 using a scheduling technique. The scheduling technique can be the same or different than the scheduling technique than was previously used for frame n.

Returning to decision state 612, if the frame is not full, flow continues to a block 616 where the CPE selects connection data that is associated with a second class of service. This second class of service has a lower priority than the first class of service. Flow moves to a block 618 where the CPE assigns the selected connection data to the frame using a scheduling technique. The scheduling technique is used to prioritize the connections within the second class of service. The scheduling technique can be, for example, RR, WRR, or DRR. Flow moves to a decision block 620 where the CPE determines whether the frame is full. If the frame is full, the process continues to a block 614 where the frame count is incremented by one. The process then returns to block 602 as described above.

Returning to decision block 620, if the frame is not full, flow continues to a block 622 where the CPE selects connection data that is associated with a third class of service. This third class of service has a lower priority than the second class of service. Flow moves to a block 623 where the CPE assigns the selected connection data to the frame using a scheduling technique. The scheduling technique is used to prioritize the connections within the third class of service. The scheduling technique can be, for example, RR, WRR, or DRR. Flow moves to a decision block 624 where the CPE determines whether the frame is full. If the frame is full, the process continues to a block 614 where the frame count is incremented by one. Flow then returns to block 602 as described above.

Returning to decision block 624, if the frame is not full, flow continues to a block 626 where the CPE re-links the excess demand of the second and third classes of service together. This linking is a round-robin mini-cycle as described above. In this example, the second and third classes of service are linked together. However, the CPE can link one or more classes of service together. Moreover, the CPE can select connection data from fewer than all of the connections associated with one of the re-linked classes of service. For example, the CPE can select connection data associated with a specific connection identification (CID) while not selecting connection data that is associated with another CID even though both CIDs are associated with the same class of service. The process moves to a block 628 where the CPE selects connection data that is associated with the re-linked classes of service. Flow moves to a block 630 where the CPE assigns the selected connection data to the frame using a scheduling technique. The scheduling technique is used to prioritize the re-grouped classes of service. The scheduling technique can be, for example, RR, WRR, or DRR. The frame is transmitted by the CPE to the base station.

The scheduling methods and systems described above allow true proper scheduling of committed rates. Simultaneously, the methods allow any excess physical slots to be scheduled using a different scheduling method and system. Further, excess demand of multiple classes of service may be scheduled simultaneously with each other or with non-excess demand from lower classes of service as if they were all part of a larger class of service. Thus, the scheduling method and system allows correct allocation of committed rates and excess demand without starvation of lower classes of service.

The methods and systems disclosed herein can be implemented in a base station, CPE, or jointly by the base station and the CPE. For example, the base station can utilize one or more of these techniques to prioritize the transmission of connection data from the base station to the CPEs in the PHY modes 312(*a*)–(*n*) of the frame 300. The connection data intended for the CPEs is buffered in queues at the base station. The connection data is then linked by class of service. The base station applies one or more scheduling techniques described herein based on the class of service associated with each connection. In one embodiment, connection data chosen can be sorted based on criteria, for example, modulation robustness.

In conjunction with, or separately from, the base station applying the methods and systems described herein, one or more CPEs can apply the scheduling techniques to the connection data prior to its transmission in uplink data blocks 314(*a*)–(*n*) to the base station.

In another embodiment, the base station applies the scheduling techniques for the connection data buffered in the queues at one or more of the CPEs. A criteria can be applied in embodiments where the base station allocates bandwidth for the uplink from the CPEs based on a logical representation of each CPE's data queues. The base station would receive status information in an uplink subframe regarding the connection data buffered at one or more CPEs. The base station applies one or more scheduling techniques to determine an uplink frame map for each CPE.

The base station determines an uplink frame map which allocates portions of the uplink subframe to each CPE. Depending on its allocated portion, the CPE applies a scheduling method to determine the priority for each of its buffered connections.

The methods and systems described above can be implemented by the CPE and/or base station using software and/or hardware. For example, the software may advantageously be configured to reside on an addressable storage medium and be configured to execute on one or more processors. Thus, the software and/or hardware may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, FPGAs, ASICs, controllers, computers, and firmware to implement those methods described above. The functionality provided for in the software and/or hardware may be combined into fewer components or further separated into additional components. Additionally, the components may advantageously be implemented to execute on one or more computers.

The foregoing description details certain preferred embodiments of the present invention and describes the best mode contemplated. It will be appreciated, however, that no matter how detailed the foregoing appears in text, the invention can be practiced in many ways. As noted above, these same methods can be used in other communication systems using the same or similar hardware and/or software. As is also stated above, it should be noted that the use of particular terminology when describing certain features or aspects of the present invention should not be taken to imply that the terminology is being re-defined defined herein to be restricted to including any specific characteristics of the features or aspects of the invention with which that terminology is associated. The scope of the present invention should therefore be construed in accordance with the appended claims and any equivalents thereof.

What is claimed is:

1. A method of scheduling data from a plurality of connections for transmission in a frame based communication system and between a transmitting node and at least one receiving node, the plurality of connections being associated with multiple classes of service, the method comprising:
   receiving data from the plurality of connections at the transmitting node;
   selecting a first data group that is associated with a first class of service from the data;
   allocating bandwidth for the first data group within a first frame to meet a minimum guaranteed data rate associated with said first class of service;
   allocating bandwidth for a second data group associated with a second class of service within the first frame to meet a minimum guaranteed rate associated with said second class of service subject to an availability of bandwidth in said first frame following said allocation of bandwidth for said first data group;
   allocating bandwidth within the first frame for transmitting excess demand subject to an availability of bandwidth in said first frame following said allocation of bandwidth for said second group; and
   transmitting the first data group, the second data group, and the excess demand to a first receiving node during the first frame.

2. The method of claim 1, further comprising transmitting the first data group, the second data group, and the excess demand to a second receiving node, the plurality of connections being associated with the first and second receiving nodes.

3. The method of claim 1, further comprising:
   transmitting a logical representation of the data to the receiving node; and
   transmitting a scheduling map to the transmitting node, the scheduling map comprising bandwidth allocations for the first data group, the second data group, and the excess demand in the first frame.

4. A method of scheduling uplink transmission data from customer premise equipment (CPEs) by a base station using hierarchical round-robin scheduling comprising:

receiving data from connections at the CPEs, the connections being associated with a plurality of classes;

storing the data at each CPE;

transmitting a representation of the received data to the base station;

determining a first uplink schedule at the base station for a first group of the connections up to each connection's committed rate using a first allocation scheme with a first priority applied between at least two of the plurality of classes;

determining a second uplink schedule at the base station for a second group of the connections, which comprise one or more of the connections from the first group, which request additional allocation in excess of the committed rates that are within peak allowed rates using a second allocation scheme, wherein the plurality of classes have equal priority;

notifying the CPEs of the first and second uplink schedules; and normalizing the data from each CPEs current modulation to a common modulation.

5. The method of claim 4, wherein storing the data comprises assigning at least one queue to each of at least some of the connections.

6. The method of claim 4, wherein the logical representation comprises bandwidth requests from the connections.

7. The method of claim 4, wherein the first priority comprises a strict priority between at least two of the plurality of classes.

8. The method of claim 4, wherein the first priority comprises a modified strict priority between at least two of the plurality of classes.

9. The method of claim 4, wherein the first allocation scheme comprises round robin, weighted round robin, deficit round robin, or weighted fair queuing.

10. The method of claim 4, wherein the second allocation scheme comprises round robin, weighted round robin, deficit round robin, or weighted fair queuing.

11. The method of claim 4, further comprising normalizing the data from each CPE's current PHY mode to a PHY unit.

12. The method of claim 11, wherein the PHY unit is modulation symbols.

13. A method of scheduling data for downlink transmission in a communication system which uses multiple modulations, wherein a base station transmits connection data that is associated with more than one modulation technique to more than one CPE, the method comprising:

receiving connection data at the base station;

storing the connection data;

selecting a first portion of the connection data that is associated with a first class of service using a first scheduling technique;

allocating bandwidth within a first frame for transmitting the first portion to meet a first minimum guaranteed data rate associated with said first class of service;

selecting a second portion of the connection data that is associated with a second class of service using a second scheduling technique and allocating bandwidth within the first frame for transmitting the second portion to meet a second minimum guaranteed data rate associated with said second class of service subject to an availability of bandwidth in said first frame following said allocation of said bandwidth for transmission of said first portion, grouping a third portion of the connection data comprising an excess portion of the connection data and allocating bandwidth within the first frame for transmitting the third portion subject to an availability of bandwidth in said first frame following said allocation of said bandwith for transmission of said second portion; and transmitting the first, second, and third portions during the first frame to the CPEs.

14. A system comprising:

a base station capable of receiving information on one or more uplink communication channels; and a CPE station comprising a plurality of queues for storing data from associated connections for transmission to said base station in allocatable time slots of frames transmitted in at least one of said uplink communication channels, one or more of said connections being associated with one of a plurality of classes of service, said CPE station being adapted to:

establish a priority between at least first and second classes of service based, at least in part, on a ranking of said first and second classes of service among said plurality of classes of service;

allocate time slots of a frame in said at least one of said uplink communication channels to a one or more of said queues associated with a first group of said connections associated with said first class of service to meet a data rate commitment associated with said first group of said connections;

allocate time slots of said frame to one or more of said queues associated with a second group of said connections associated with said second class of service to meet a data rate commitment associated with said second group of said connections; and allocate any remaining time slots of said frame between said first and second groups of connections according to said priority between said at least first and second classes of service.

15. The system of claim 14, wherein said priority comprises a strict priority.

16. The system of claim 14, wherein said priority comprises a modified strict priority.

17. The system of claim 14, wherein said CPE station is further adapted to allocate time slots among queues associated with said first group of connections according to a round robin allocation scheme.

18. The system of claim 14, wherein said CPE station is further adapted to allocate time slots among queues associated with said first group of connections according to a weighted round robin scheme.

19. The system of claim 14, wherein said CPE station is further adapted to allocate time slots among queues associated with said first group of connections according to a deficit round robin scheme.

* * * * *